US012754535B2

(12) United States Patent
Lu

(10) Patent No.: US 12,754,535 B2
(45) Date of Patent: Oct. 6, 2026

(54) SYSTEMS, APPARATUSES, METHODS, AND COMPUTER PROGRAM PRODUCTS FOR OPTIMIZING ONE OR MORE INTERMEDIATE PHYSICAL STREAMS OR ONE OR MORE INTERMEDIATE PHYSICAL UNITS OF A PLANT

(71) Applicant: HONEYWELL INTERNATIONAL INC., Charlotte, NC (US)

(72) Inventor: Joseph Z. Lu, Glendale, AZ (US)

(73) Assignee: Honeywell International Inc., Charlotte, NC (US)

( * ) Notice: Subject to any disclaimer, the term of this patent is extended or adjusted under 35 U.S.C. 154(b) by 494 days.

(21) Appl. No.: 18/352,678

(22) Filed: Jul. 14, 2023

(65) Prior Publication Data

US 2025/0021083 A1 Jan. 16, 2025

(51) Int. Cl.
*G05B 19/418* (2006.01)

(52) U.S. Cl.
CPC . *G05B 19/41865* (2013.01); *G05B 19/41885* (2013.01)

(58) Field of Classification Search
None
See application file for complete search history.

(56) References Cited

U.S. PATENT DOCUMENTS

| | | | | |
|---|---|---|---|---|
| 6,442,512 | B1 * | 8/2002 | Sengupta | G06F 9/451 703/2 |
| 6,907,383 | B2 * | 6/2005 | Eryurek | G01F 1/363 702/100 |
| 9,442,475 | B2 * | 9/2016 | Subramanian | G06F 30/20 |
| 10,386,823 | B2 * | 8/2019 | Heck | G05B 11/011 |
| 12,025,975 | B2 * | 7/2024 | Pelella | G05B 17/02 |
| 2005/0096872 | A1 * | 5/2005 | Blevins | G05B 17/02 702/183 |
| 2007/0208549 | A1 * | 9/2007 | Blevins | G05B 17/02 703/6 |
| 2008/0052049 | A1 * | 2/2008 | Moriyama | G06F 30/20 703/2 |
| 2009/0089030 | A1 * | 4/2009 | Sturrock | G05B 17/02 703/7 |
| 2011/0131017 | A1 * | 6/2011 | Cheng | G05B 19/41885 703/2 |

(Continued)

*Primary Examiner* — Jason Lin
(74) *Attorney, Agent, or Firm* — Alston & Bird LLP

(57) ABSTRACT

Systems, apparatuses, methods, and computer program products are provided herein. For example, a computer-implemented method may include generating a flow sheet model. In some embodiments, the computer-implemented method may include identifying an intermediate physical stream from the plurality of physical streams of the plant. In some embodiments, the computer-implemented method may include determining input impact value data for the intermediate physical stream based at least in part on the flow sheet model. In some embodiments, the computer-implemented method may include determining output impact value data for the intermediate physical stream based at least in part on the flow sheet model. In some embodiments, the computer-implemented method may include generating an impact value report based at least in part on the input impact value data and the output impact value data.

20 Claims, 7 Drawing Sheets

600

(56) References Cited

U.S. PATENT DOCUMENTS

| | | | | |
|---|---|---|---|---|
| 2012/0003623 | A1* | 1/2012 | Bartee | C12M 21/12<br>435/286.1 |
| 2012/0029661 | A1* | 2/2012 | Jones | G05B 19/41865<br>700/17 |
| 2014/0330542 | A1* | 11/2014 | Subramanian | G06F 30/20<br>703/1 |

* cited by examiner

SYSTEMS, APPARATUSES, METHODS, AND COMPUTER PROGRAM PRODUCTS FOR OPTIMIZING ONE OR MORE INTERMEDIATE PHYSICAL STREAMS OR ONE OR MORE INTERMEDIATE PHYSICAL UNITS OF A PLANT

TECHNOLOGICAL FIELD

Embodiments of the present disclosure relate generally to systems, apparatuses, methods, and computer program products for optimizing one or more intermediate physical streams or one or more intermediate physical units of a plant.

BACKGROUND

Applicant has identified many technical challenges and difficulties associated with systems, apparatuses, methods, and computer program products for optimizing one or more intermediate physical streams or one or more intermediate physical units of a plant. Through applied effort, ingenuity, and innovation, Applicant has solved problems related to systems, apparatuses, methods, and computer program products for optimizing one or more intermediate physical streams or one or more intermediate physical units of a plant by developing solutions embodied in the present disclosure, which are described in detail below.

BRIEF SUMMARY

Various embodiments described herein relate to systems, apparatuses, methods, and computer program products for optimizing one or more intermediate physical streams or one or more intermediate physical units of a plant.

In accordance with one aspect of the disclosure, a computer-implemented method is provided. In some embodiments, the computer-implemented method may include generating a flow sheet model. In some embodiments, the flow sheet model is representative of a layout of a plurality of physical units and a plurality of physical streams of a plant. In some embodiments, the computer-implemented method may include identifying an intermediate physical stream from the plurality of physical streams of the plant. In some embodiments, the computer-implemented method may include determining input impact value data for the intermediate physical stream based at least in part on the flow sheet model. In some embodiments, the computer-implemented method may include determining output impact value data for the intermediate physical stream based at least in part on the flow sheet model. In some embodiments, the computer-implemented method may include generating an impact value report based at least in part on the input impact value data and the output impact value data.

In some embodiments, the computer-implemented method may include determining differential impact value data for the intermediate physical stream based at least in part on the input impact value data and the output impact value data.

In some embodiments, the computer-implemented method may include identifying an intermediate physical unit from the plurality of physical units of the plant.

In some embodiments, the computer-implemented method may include identifying one or more output intermediate physical streams associated with the intermediate physical unit from the plurality of physical streams and one or more input intermediate physical streams associated with the intermediate physical unit from the plurality of physical streams.

In some embodiments, the one or more output intermediate physical streams are associated with unit output contribution data and the one or more unit input intermediate physical streams are associated with unit input contribution data.

In some embodiments, the computer-implemented method may include determining unit input impact value data based at least in part on the unit input contribution data.

In some embodiments, the computer-implemented method may include determining unit output impact value data based at least in part on the unit output contribution data.

In some embodiments, the computer-implemented method may include generating an impact value report based at least in part on the unit input impact value data and the unit output impact value data.

In some embodiments, at least one of the one or more input intermediate physical streams is configured to provide a first intermediate product to the intermediate physical unit.

In some embodiments, at least one of the one or more output intermediate physical streams is configured to receive a second intermediate product from the intermediate physical unit.

In some embodiments, the intermediate physical unit is configured to generate the second intermediate product based at least in part on the first intermediate product.

In some embodiments, the computer-implemented method may include determining differential unit impact value data for the intermediate physical unit based at least in part on the unit input impact value data, the unit output impact value data, and unit processing data associated with the intermediate physical unit.

In some embodiments, the computer-implemented method may include initiating performance of one or more physical stream optimization actions based at least in part on the input impact value data or the output impact value data.

In some embodiments, the computer-implemented method may include initiating performance of one or more physical unit optimization actions based at least in part on the unit input impact value data or the unit output impact value data.

In some embodiments, the flow sheet model is generated based at least in part on a physical representation data associated with the plant.

In accordance with another aspect of the disclosure, an apparatus is provided. In some embodiments, the apparatus may include at least one processor and at least one non-transitory memory including computer-coded instructions thereon. In some embodiments, the computer-coded instructions, with the at least one processor, cause the apparatus to generate a flow sheet model. In some embodiments, the flow sheet model is representative of a layout of a plurality of physical units and a plurality of physical streams of a plant. In some embodiments, the computer-coded instructions, with the at least one processor, cause the apparatus to identify an intermediate physical stream from the plurality of physical streams of the plant. In some embodiments, the computer-coded instructions, with the at least one processor, cause the apparatus to determine input impact value data for the intermediate physical stream based at least in part on the flow sheet model. In some embodiments, the computer-coded instructions, with the at least one processor, cause the apparatus to determine output impact value data for the intermediate physical stream based at least in part on the flow sheet model. In some embodiments, the computer-coded instructions, with the at least one processor, cause the apparatus to generate an impact value report based at least in part on the input impact value data and the output impact value data.

In some embodiments, the computer-coded instructions, with the at least one processor, cause the apparatus to determine differential impact value data for the intermediate physical stream based at least in part on the input impact value data and the output impact value data.

In some embodiments, the computer-coded instructions, with the at least one processor, cause the apparatus to identify an intermediate physical unit from the plurality of physical units of the plant.

In some embodiments, the computer-coded instructions, with the at least one processor, cause the apparatus to identify one or more output intermediate physical streams associated with the intermediate physical unit from the plurality of physical streams and one or more input intermediate physical streams associated with the intermediate physical unit from the plurality of physical streams.

In some embodiments, the one or more output intermediate physical streams are associated with unit output contribution data and the one or more unit input intermediate physical streams are associated with unit input contribution data.

In some embodiments, the computer-coded instructions, with the at least one processor, cause the apparatus to determine unit input impact value data based at least in part on the unit input contribution data.

In some embodiments, the computer-coded instructions, with the at least one processor, cause the apparatus to determine unit output impact value data based at least in part on the unit output contribution data.

In some embodiments, the computer-coded instructions, with the at least one processor, cause the apparatus to generate an impact value report based at least in part on the unit input impact value data and the unit output impact value data.

In some embodiments, at least one of the one or more input intermediate physical streams is configured to provide a first intermediate product to the intermediate physical unit.

In some embodiments, at least one of the one or more output intermediate physical streams is configured to receive a second intermediate product from the intermediate physical unit.

In some embodiments, the intermediate physical unit is configured to generate the second intermediate product based at least in part on the first intermediate product.

In some embodiments, the computer-coded instructions, with the at least one processor, cause the apparatus to determine differential unit impact value data for the intermediate physical unit based at least in part on the unit input impact value data, the unit output impact value data, and unit processing data associated with the intermediate physical unit.

In some embodiments, the computer-coded instructions, with the at least one processor, cause the apparatus to initiate performance of one or more physical stream optimization actions based at least in part on the input impact value data or the output impact value data.

In some embodiments, the computer-coded instructions, with the at least one processor, cause the apparatus to initiate performance of one or more physical unit optimization actions based at least in part on the unit input impact value data or the unit output impact value data.

In some embodiments, the flow sheet model is generated based at least in part on a physical representation data associated with the plant.

In accordance with another aspect of the disclosure, a computer program product is provided. In some embodiments, the computer program product includes at least one non-transitory computer-readable storage medium having computer program code stored thereon. In some embodiments, the computer program code, in execution with at least one processor, configures the computer program product generating a flow sheet model. In some embodiments, the flow sheet model is representative of a layout of a plurality of physical units and a plurality of physical streams of a plant. In some embodiments, the computer program code, in execution with at least one processor, configures the computer program product identifying an intermediate physical stream from the plurality of physical streams of the plant. In some embodiments, the computer program code, in execution with at least one processor, configures the computer program product determining input impact value data for the intermediate physical stream based at least in part on the flow sheet model. In some embodiments, the computer program code, in execution with at least one processor, configures the computer program product determining output impact value data for the intermediate physical stream based at least in part on the flow sheet model. In some embodiments, the computer program code, in execution with at least one processor, configures the computer program product generating an impact value report based at least in part on the input impact value data and the output impact value data.

In some embodiments, the computer program code, in execution with at least one processor, configures the computer program product determining differential impact value data for the intermediate physical stream based at least in part on the input impact value data and the output impact value data.

In some embodiments, the computer program code, in execution with at least one processor, configures the computer program product identifying an intermediate physical unit from the plurality of physical units of the plant.

In some embodiments, the computer program code, in execution with at least one processor, configures the computer program product identifying one or more output intermediate physical streams associated with the intermediate physical unit from the plurality of physical streams and one or more input intermediate physical streams associated with the intermediate physical unit from the plurality of physical streams.

In some embodiments, the one or more output intermediate physical streams are associated with unit output contribution data and the one or more unit input intermediate physical streams are associated with unit input contribution data.

In some embodiments, the computer program code, in execution with at least one processor, configures the computer program product determining unit input impact value data based at least in part on the unit input contribution data.

In some embodiments, the computer program code, in execution with at least one processor, configures the computer program product determining unit output impact value data based at least in part on the unit output contribution data.

In some embodiments, the computer program code, in execution with at least one processor, configures the computer program product generating an impact value report based at least in part on the unit input impact value data and the unit output impact value data.

In some embodiments, at least one of the one or more input intermediate physical streams is configured to provide a first intermediate product to the intermediate physical unit.

In some embodiments, at least one of the one or more output intermediate physical streams is configured to receive a second intermediate product from the intermediate physical unit.

In some embodiments, the intermediate physical unit is configured to generate the second intermediate product based at least in part on the first intermediate product.

In some embodiments, the computer program code, in execution with at least one processor, configures the computer program product determining differential unit impact value data for the intermediate physical unit based at least in part on the unit input impact value data, the unit output impact value data, and unit processing data associated with the intermediate physical unit.

In some embodiments, the computer program code, in execution with at least one processor, configures the computer program product initiating performance of one or more physical stream optimization actions based at least in part on the input impact value data or the output impact value data.

In some embodiments, the computer program code, in execution with at least one processor, configures the computer program product initiating performance of one or more physical unit optimization actions based at least in part on the unit input impact value data or the unit output impact value data.

In some embodiments, the flow sheet model is generated based at least in part on a physical representation data associated with the plant.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
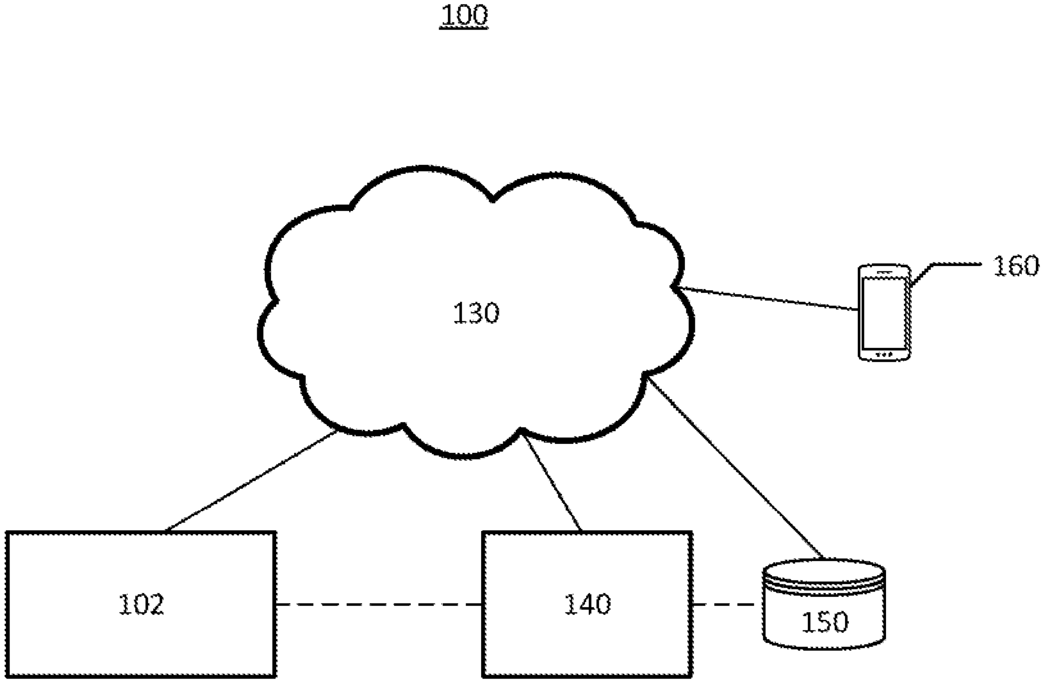
FIG. 1 illustrates an exemplary block diagram of an environment in which embodiments of the present disclosure may operate.

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system, or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

Overview

Example embodiments disclosed herein address technical problems associated with systems, apparatuses, methods, and computer program products for optimizing one or more intermediate physical streams or one or more intermediate physical units of a plant. As would be understood by one skilled in the field to which this disclosure pertains, there are numerous example scenarios in which a user may use systems, apparatuses, methods, and computer program products for optimizing one or more intermediate physical streams or one or more intermediate physical units of a plant.

In many applications, systems, apparatuses, methods, and computer program products for optimizing one or more intermediate physical streams or one or more intermediate physical units of a plant are necessary. For example, it may be necessary to optimize one or more intermediate physical streams or one or more intermediate physical units of a plant in order to control the plant's emissions. As another example, it may be necessary to optimize one or more intermediate physical streams or one or more intermediate physical units of a plant in order to control how much final product the plant produces. As another example, it may be necessary to optimize one or more intermediate physical streams or one or more intermediate physical units of a plant to control maintenance actions associated with the plant.

Example solutions for optimizing one or more intermediate physical streams or one or more intermediate physical units of a plant include, for example, tracking marginal values and/or shadow values associated with the plant and optimizing one or more intermediate physical streams, or one or more intermediate physical units of the plant based on the tracked marginal values and/or shadow values. However, in such an example solution it is often not possible to accurately track marginal values and/or shadow values such that a correct optimization action can be implemented to properly optimize the one or more intermediate physical streams or the one or more intermediate physical units of the plant.

Thus, to address these and/or other issues related to systems, apparatuses, methods, and computer program products for optimizing one or more intermediate physical streams or one or more intermediate physical units of a plant, example systems, apparatuses, methods, and computer program product for optimizing one or more intermediate physical streams or one or more intermediate physical units of a plant are disclosed herein. For example, an embodiment in this disclosure, described in greater detail below, includes a computer-implemented method that includes generating a flow sheet model. In some embodiments, the flow sheet model is representative of a layout of a plurality of physical units and a plurality of physical streams of a plant. In some embodiments, the computer-implemented method may include identifying an intermediate physical stream from the plurality of physical streams of the plant. In some embodiments, the computer-implemented method may include determining input impact value data for the intermediate physical stream based at least in part on the flow sheet model. In some embodiments, the computer-implemented method may include determining output impact value data for the intermediate physical stream based at least in part on the flow sheet model. In some embodiments, the computer-implemented method may include generating an impact value report based at least in part on the input impact value data and the output impact value data. Accordingly, embodiments disclosed herein enable for efficient and accurate optimization of one or more intermediate physical streams or one or more intermediate physical units of a plant.

Example Systems and Apparatuses

Embodiments of the present disclosure herein include systems, apparatuses, methods, and computer program products configured for optimizing one or more intermediate physical streams or one or more intermediate physical units of a plant. It should be readily appreciated that the embodiments of the apparatus, systems, methods, and computer program product described herein may be configured in various additional and alternative manners in addition to those expressly described herein.

FIG. 1 illustrates an exemplary block diagram of an environment 100 in which embodiments of the present disclosure may operate. Specifically, FIG. 1 illustrates a plant 102. In some embodiments, for example, the plant 102 may be any type of plant associated with a user associated with the environment 100. In this regard, the plant 102 may, for example, be a processing plant that receives and processes ingredients as inputs to create a processed product, such as a hydrocarbon processing plant, a refinery, a pulp and paper plant, a chemical plant, an alumina plant, a drilling facility, a fracking field, and/or the like.

The plant 102 in some embodiments includes any number of individual physical units. The physical units of the plant 102 may perform a particular function during operation of the plant 102. For example, the physical units may include one or more well physical units, fracking physical units, crude processing physical units (e.g., crude processing physical units having a vacuum section), hydrotreating physical units, isomerization physical units, reforming physical units, vapor recovery physical units, fluid catalytic cracking physical units, batch blending physical units, rundown blending physical units, hydrocracking physical units, alkylation physical units, dewaxing physical units, deasphalter physical units (e.g., propane deasphalter physical units), aromatics reduction physical units, delayed cooker physical units, visbreaker physical units, digester physical units, thermomechanical grinding physical units, bleaching physical units, storage tank physical units, blender physical units, pump physical units, flash venting physical units, compressor physical units, cooler physical units (e.g., air cooler physical units), sensor physical units, storage physical units, flare physical units, heating, ventilation, and air (HVAC) physical units, lighting physical units, and/or the like that perform a particular operation for transforming, separating, reacting, reforming, digesting, bleaching, storing, releasing, and/or otherwise handling one or more input ingredient(s), intermediate product(s), and/or final product(s) (e.g., hydrocarbons, gases, etc.). In this regard, for example, the individual physical units of the plant 102 may include physical units associated with a particular process performed by the plant 102.

The plant 102 in some embodiments includes any number of individual physical streams. The physical streams of the plant 102 may perform a particular function during operation of the plant 102. For example, the physical streams may include one or more liquefied petroleum gas physical streams, straight-run gasoline physical streams, naphtha physical streams, middle distillates physical streams, crude physical streams, heavy atmospheric gasoil physical streams, vacuum gasoil physical streams, lube base stocks physical streams, fuel gas physical streams, light gasoil physical streams, gasoline physical streams, fractionator bottoms physical streams, fuel oil physical streams, asphalt physical streams, refinery fuel physical streams, regular gasoline physical streams, solvents physical streams, aviation fuel physical streams, diesel physical streams, heating oil physical streams, lube oil physical streams, grease physical streams, industrial fuel physical streams, wood chip physical streams, brown stock physical streams, white liquor physical streams, bleached pulp physical streams, and/or the like that perform a particular operation for transforming, storing, releasing, transporting, and/or otherwise handling one or more input ingredient(s), intermediate product(s), and/or final product(s) (e.g., hydrocarbons, gases, etc.). In this regard, for example, the individual physical streams of the plant 102 may include physical streams associated with a particular process performed by the plant 102.

In some embodiments, each individual physical unit and/or each individual physical stream of the plant 102 is associated with a determinable location. The determinable location of a particular physical unit and/or physical stream in some embodiments represents an absolute position (e.g., GPS coordinates, latitude, and longitude locations, and/or the like) or a relative position (e.g., a point representation of the location of a physical unit and/or physical stream from a local origin point corresponding to the plant 102). In some embodiments, a physical unit and/or physical stream includes or otherwise is associated with a location sensor and/or software-driven location services that provide the location data representing the location corresponding to that physical unit and/or physical stream. In other embodiments the location of a physical unit and/or physical stream is stored and/or otherwise predetermined within a software environment, provided by a user and/or otherwise determinable to one or more systems.

Additionally or alternatively, in some embodiments, the plant 102 itself is associated with a determinable location. The determinable location of the plant 102 in some embodiments represents an absolute position (e.g., GPS coordinates, latitude and longitude locations, an address, and/or the like) or a relative position of the plant 102 (e.g., an identifier representing the location of the plant 102 as compared to one or more other plants, one or more other buildings, an enterprise headquarters, or general description in the world for example based at least in part on continent, state, or other definable region). In some embodiments, the plant 102 includes or otherwise is associated with a location sensor and/or software-driven location services that provide the location data corresponding to the plant 102. In other embodiments, the location of the plant 102 is stored and/or otherwise determinable to one or more systems.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

In some embodiments, the environment 100 may include a plant optimization system 140. In some embodiments, for example, the plant optimization system 140 may be configured to optimize one or more plants (e.g., plant 102). The plant optimization system 140 may be electronically and/or communicatively coupled to the plant 102, individual physical units of the plant 102, one or more databases 150, and/or one or more user devices 160. The plant optimization system 140 may be located remotely, in proximity of, and/or within the plant 102. In some embodiments, the plant optimization system 140 is configured via hardware, software, firmware, and/or a combination thereof, to perform data intake of one or more types of data associated with one or more of the plant 102. Additionally or alternatively, in some embodiments, the plant optimization system 140 is configured via hardware, software, firmware, and/or a combination thereof, to generate and/or transmit command(s) that control, adjust, or otherwise impact operations of one or more of the plant 102 or specific physical unit(s) thereof, for example for controlling one or more operations of the plant 102. Additionally or alternatively still, in some embodiments, the plant optimization system 140 is configured via hardware, software, firmware, and/or a combination thereof, to perform data reporting and/or other data output process(es) associated with monitoring or otherwise analyzing operations of one or more of the plant 102 or specific physical unit(s) thereof, for example for generating and/or outputting report (s) corresponding to the operations performed via the plant 102. For example, in various embodiments, the plant optimization system 140 may be configured to execute and/or perform one or more operations and/or functions described herein.

The one or more databases 150 may be configured to receive, store, and/or transmit data. In some embodiments, the one or more databases 150 may be associated with data associated with the plant 102. In some embodiments, the data may be received from the plant 102. In this regard, for example, the plant 102 may have one or more sensors that capture data and/or one or more datastores that store data. In some embodiments, the data may be received from the plant optimization system 140. In this regard, for example, the plant optimization system 140 may be configured to identify data associated with the plant 102. In some embodiments, the one or more databases 150 may be associated with data received from the plant 102 and/or the plant optimization system 140 in real-time. Additionally or alternatively, the one or more databases 150 may be associated with data received from the plant 102 and/or the plant optimization system 140 on a periodic basis (e.g., the data may be received from the plant 102 and/or the plant optimization system 140 once per day). Additionally or alternatively, the one or more databases 150 may be associated with historical physical representation received from the plant 102 and/or the plant optimization system 140 (e.g., physical representation previously received from the plant 102 and/or the plant optimization system 140). Additionally or alternatively, the one or more databases 150 may be associated with data received from the plant 102 and/or the plant optimization system 140 in response to a request for the data. Additionally or alternatively, the one or more databases 150 may be associated with data inputted (e.g., by a user) into the plant optimization system 140 and/or the one or more user devices 160.

The one or more user devices 160 may be associated with users of the plant optimization system 140. In various embodiments, the plant optimization system 140 may generate and/or transmit a message, alert, or indication to a user via a user device 160. Additionally, or alternatively, a user device 160 may be utilized by a user to remotely access the plant optimization system 140. This may be by, for example, an application operating on the user device 160. A user may access the plant optimization system 140 remotely, including one or more visualizations, reports, and/or real-time displays.

Additionally, while FIG. 1 illustrates certain components as separate, standalone entities communicating over the network 130, various embodiments are not limited to this configuration. In other embodiments, one or more components may be directly connected and/or share hardware or the like. For example, in some embodiments, the plant optimization system 140 may include the one or more databases 150, which may collectively be located in or at the plant 102.

Figure 2:
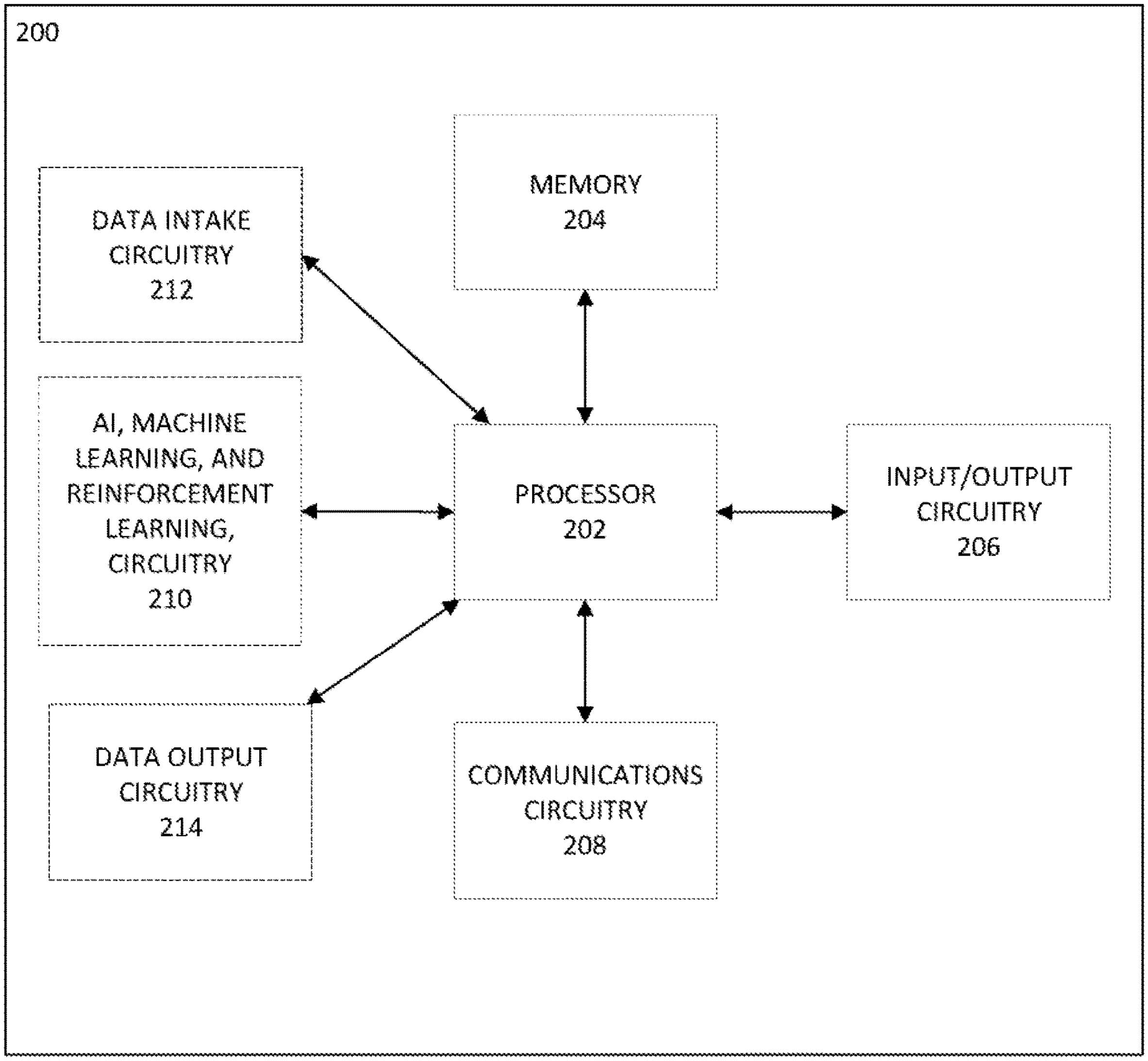
FIG. 2 illustrates an exemplary block diagram of an example apparatus that may be specially configured in accordance with an example embodiment of the present disclosure.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. For example, the computing apparatus 200 may be embodied as one or more of a specifically configured personal computing apparatus, a specifically configured cloud based computing apparatus, a specifically configured embedded computing device (e.g., configured for edge computing, and/or the like). Examples of an apparatus 200 may include, but is not limited to, a plant optimization system 140, the one or more databases 150, and/or a user device 160. The apparatus 200 includes processor 202, memory 204, input/output circuitry 206, communications circuitry 208, and/or optional artificial intelligence ("AI") and machine learning circuitry 210. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, such as computing apparatus 200 of a plant optimization system 140 or of a user device 160 may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device, one or more sensors, and/or other external computing device(s) in communication with the apparatus 200.

Data intake circuitry 212 may be included in the apparatus 200. The data intake circuitry 212 may include hardware, software, firmware, and/or a combination thereof, designed and/or configured to capture, receive, request, and/or otherwise gather data associated with operations of the plant 102. In some embodiments, the data intake circuitry 212 includes hardware, software, firmware, and/or a combination thereof, that communicates with one or more sensor(s) unit(s), and/or the like within the plant 102 to receive particular data associated with such operations of the plant 102. Additionally or alternatively, in some embodiments, the data intake circuitry 212 includes hardware, software, firmware, and/or a combination thereof, that retrieves particular data associated with the plant 102 from one or more data repository/repositories accessible to the apparatus 200.

AI and machine learning circuitry 210 may be included in the apparatus 200. The AI and machine learning circuitry 210 may include hardware, software, firmware, and/or a combination thereof designed and/or configured to request, receive, process, generate, and transmit data, data structures, control signals, and electronic information for training and executing a trained AI and machine learning model configured for facilitating the operations and/or functionalities described herein. For example, in some embodiments the AI and machine learning circuitry 210 includes hardware, software, firmware, and/or a combination thereof, that identifies training data and/or utilizes such training data for training a particular machine learning model, AI, and/or other model to generate particular output data based at least in part on learnings from the training data. Additionally or alternatively, in some embodiments, the AI and machine learning circuitry 210 includes hardware, software, firmware, and/or a combination thereof, that embodies or retrieves a trained machine learning model, AI and/or other specially configured model utilized to process inputted data. Additionally or alternatively, in some embodiments, the AI and machine learning circuitry 210 includes hardware, software, firmware, and/or a combination thereof that processes received data utilizing one or more algorithm(s), function(s), subroutine(s), and/or the like, in one or more pre-processing and/or subsequent operations that need not utilize a machine learning or AI model.

Data output circuitry 214 may be included in the apparatus 200. The data output circuitry 214 may include hardware, software, firmware, and/or a combination thereof, that configures and/or generates an output based at least in part on data processed by the apparatus 200. In some embodiments, the data output circuitry 214 includes hardware, software, firmware, and/or a combination thereof, that generates a particular report based at least in part on the processed data, for example where the report is generated based at least in part on a particular reporting protocol. Additionally or alternatively, in some embodiments, the data output circuitry 214 includes hardware, software, firmware, and/or a combination thereof, that configures a particular output data object, output data file, and/or user interface for storing, transmitting, and/or displaying. For example, in some embodiments, the data output circuitry 214 generates and/or specially configures a particular data output for transmission to another system sub-system for further processing. Additionally or alternatively, in some embodiments, the data output circuitry 214 includes hardware, software, firmware, and/or a combination thereof, that causes rendering of a specially configured user interface based at least in part on data received by and/or processing by the apparatus 200.

In some embodiments, two or more of the sets of circuitries 202-214 are combinable. Alternatively, or additionally, one or more of the sets of circuitry 202-214 perform some or all of the operations and/or functionality described herein as being associated with another circuitry. In some embodiments, two or more of the sets of circuitry 202-214 are combined into a single module embodied in hardware, software, firmware, and/or a combination thereof. For example, in some embodiments, one or more of the sets of circuitry, for example the AI and machine learning circuitry 210, may be combined with the processor 202, such that the processor 202 performs one or more of the operations described herein with respect to the AI and machine learning circuitry 210.

With reference to FIGS. 1-5, in some embodiments, the plant optimization system 140 may be configured to generate a flow sheet model 300. Additionally or alternatively, the plant optimization system 140 may be configured to receive the flow sheet model 300. For example, the plant optimization system 140 may be configured to receive the flow sheet model 300 from the plant 102 (e.g., the plant 102 may be configured to generate the flow sheet model 300). In some embodiments, the flow sheet model 300 may be representative of a layout of a plurality of physical units and/or a plurality of physical streams of the plant 102. In some embodiments, for example, the flow sheet model 300 may be generated based at least in part on physical representation data associated with the plant 102.

Figure 3:
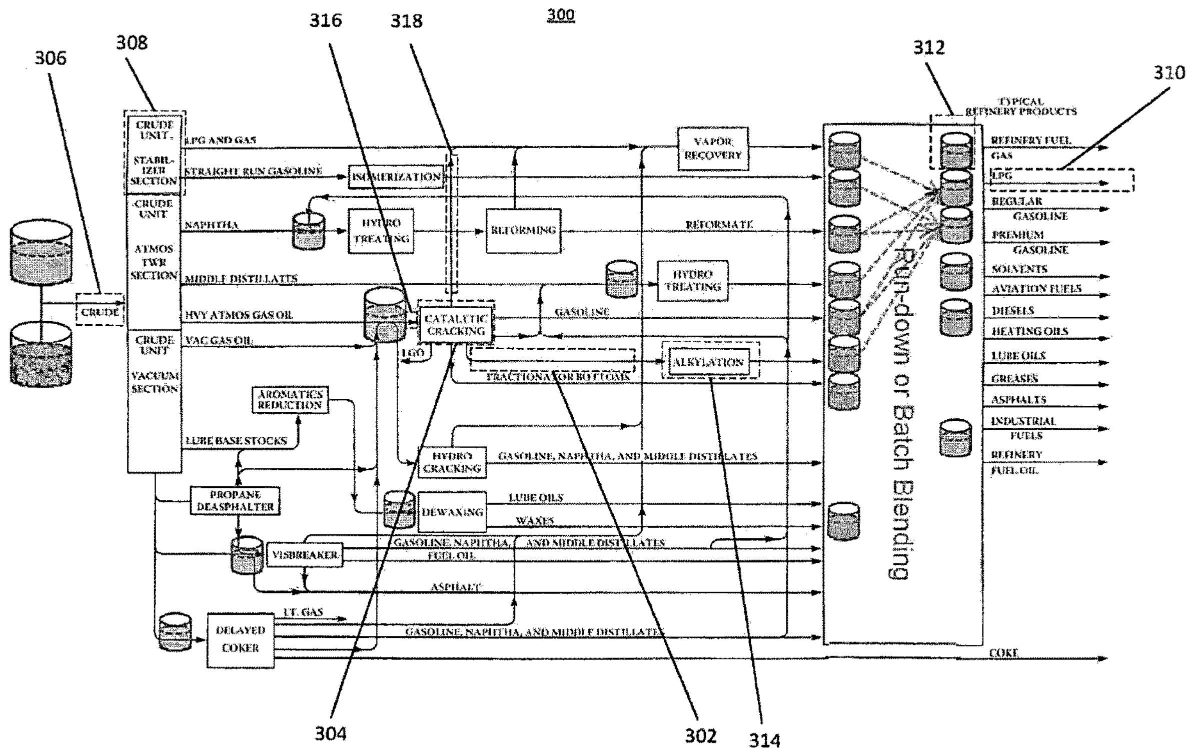
FIG. 3 illustrates a flow sheet model in accordance with one or more embodiments of the present disclosure.
Figure 4:
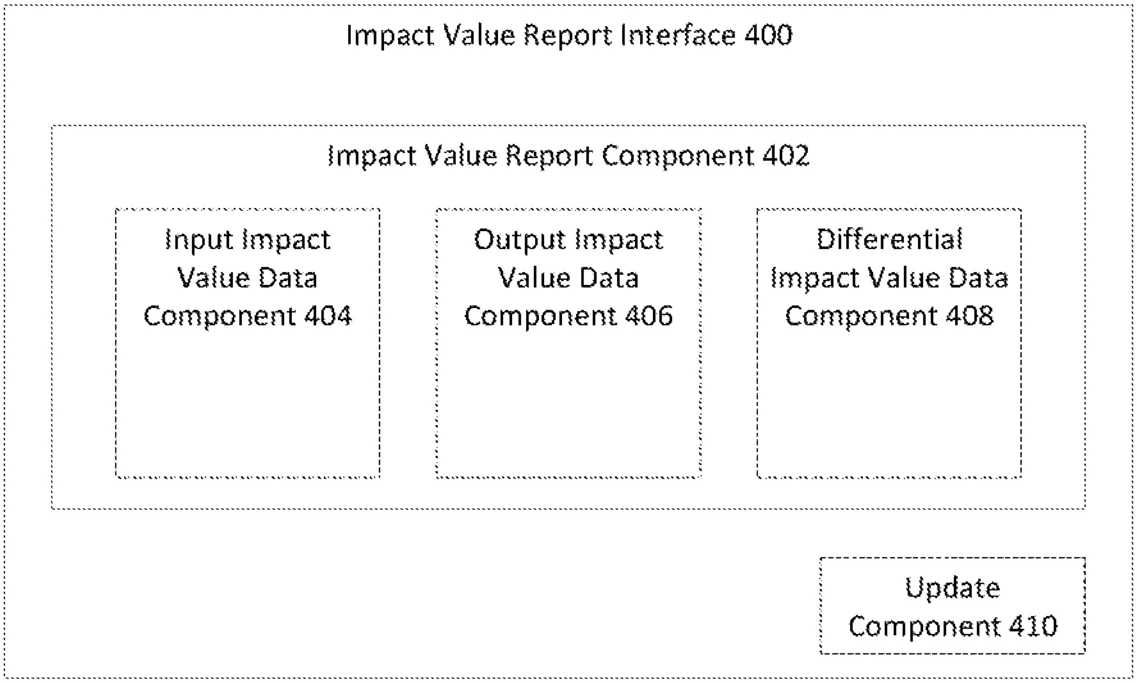
FIG. 4 illustrates an impact value report interface in accordance with one or more embodiments of the present disclosure.
Figure 5:
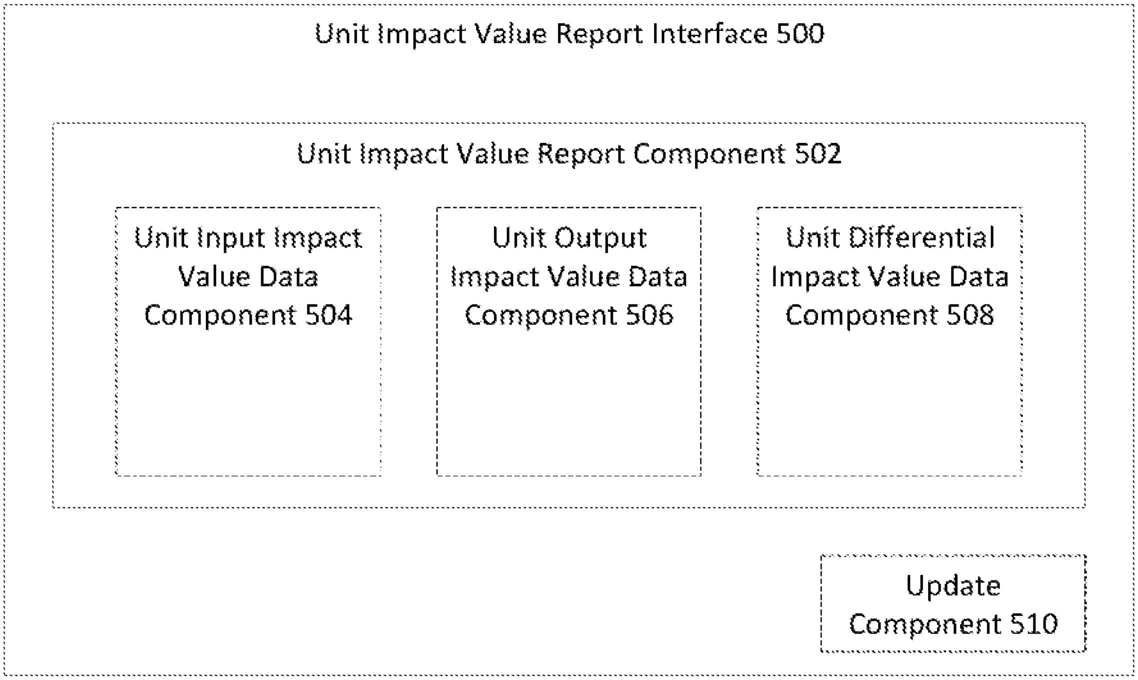
FIG. 5 illustrates a unit impact value report interface in accordance with one or more embodiments of the present disclosure.

Although depicted in FIG. 3 as the flow sheet model 300 having certain physical units (e.g., a hydrotreating physical unit) and/or physical streams (e.g., a waxes physical stream), it would be understood by one skilled in the field to which this disclosure pertains that the flow sheet model 300 may include other physical units and/or physical streams not depicted in FIG. 3. Similarly, although depicted in FIG. 3 as the flow sheet model 300 having certain physical units (e.g., a hydrotreating physical unit) and/or physical streams (e.g., a waxes physical stream), it would be understood by one skilled in the field to which this disclosure pertains that the flow sheet model 300 may not include at least some of physical units and/or physical streams depicted in FIG. 3.

In some embodiments, the plurality of physical streams may include one or more input physical streams. In this regard, an input physical stream may be configured to receive one or more input ingredients into the plant 102. For example, as illustrated in the flow sheet model 300, the plurality of physical streams may include an input physical stream 306 (e.g., a crude physical stream). In some embodiments, the plurality of physical streams may include one or more output physical streams. In this regard, an output physical stream may be configured to output one or more final products from the plant 102. For example, as illustrated in the flow sheet model 300, the plurality of physical streams may include an output physical stream 310 (e.g., a liquefied petroleum physical stream). In some embodiments, the plurality of physical streams may include one or more intermediate physical streams. In this regard, an intermediate physical stream may be configured to transport one or more intermediate products through the plant 102. For example, as illustrated in the flow sheet model 300, the plurality of physical streams may include an intermediate physical stream 302.

In some embodiments, the plurality of physical units may include one or more input physical units. In this regard, an input physical unit may be configured to transform one or more input ingredients into one or more intermediate products. For example, as illustrated in the flow sheet model 300, the plurality of physical units may include an input physical unit 308 (e.g., a crude physical unit). In some embodiments, the plurality of physical units may include one or more output physical units. In this regard, an output physical unit may be configured to transform one or more intermediate products into one or more final products. For example, as illustrated in the flow sheet model 300, the plurality of physical units may include an output physical unit 312. In some embodiments, the plurality of physical units may include one or more intermediate physical units. In this regard, an intermediate physical unit may be configured to transform one or more intermediate products into one or more other intermediate products. For example, as illustrated in the flow sheet model 300, the plurality of physical units may include an intermediate physical unit 304 (e.g., a catalytic cracking physical unit).

In some embodiments, the plant optimization system 140 may be configured to identify an intermediate physical stream from the plurality of physical streams of the plant 102. For example, the plant optimization system 140 may be configured to identify the intermediate physical stream 302.

In some embodiments, the plant optimization system 140 may be configured to determine input impact value data for the intermediate physical stream 302. In some embodiments, the input impact value data for the intermediate physical stream 302 may be data representative of a value associated with one or more intermediate products received into the intermediate physical stream 302.

In some embodiments, the input impact value data may be determined based at least in part on the flow sheet model 300. In this regard, for example, the plant optimization system 140 may be configured to determine how many upstream pathways are associated with the intermediate physical stream 302. That is, the plant optimization system 140 may be configured to determine how many upstream pathways there are from the intermediate physical stream 302 to one or more input ingredients. For example, the plant optimization system 140 may be configured to determine that the intermediate physical stream 302 has at least four upstream pathways including, for example, an upstream pathway that includes at least one or more of a catalytic cracking physical unit, a heavy atmospheric gas oil physical stream, a crude physical unit to reach an input ingredient (e.g., crude). Said differently, the plant optimization system 140 may be configured to determine how many upstream pathways there are from which an input ingredient and/or an intermediate product generated at least in part from the input ingredient could reach the intermediate physical stream 302.

In some embodiments, for at least one upstream pathway, the plant optimization system 140 may be configured to determine input contribution data. In some embodiments, input contribution data may be data representative of an amount that a particular upstream pathway contributes to the overall mass and/or volume of the intermediate products associated with the intermediate physical stream 302. For example, if the intermediate physical stream 302 is associated with four upstream pathways, the plant optimization system 140 may be configured to determine input contribution data indicating that forty percent of the overall mass and/or volume of the intermediate products associated with the intermediate physical stream 302 are associated with a first upstream pathway, thirty percent of the overall mass and/or volume of the intermediate products associated with the intermediate physical stream 302 are associated with a second upstream pathway, twenty percent of the overall mass and/or volume of the intermediate products associated with the intermediate physical stream 302 are associated with a third upstream pathway, and ten percent of the overall mass and/or volume of the intermediate products associated with the intermediate physical stream 302 are associated with a fourth upstream pathway.

In some embodiments, for at least one upstream pathway, the plant optimization system 140 may be configured to determine input ingredient value data associated with the intermediate physical stream 302. In some embodiments, the input ingredient value data may be data representative of a value associated with one or more input ingredients (e.g., input ingredients associated with an upstream pathway associated with the intermediate physical stream 302). For example, the input ingredient value data may be indicative of a cost associated with the one or more input ingredients (e.g., a cost associated with crude). As another example, the input ingredient value data may be indicative of an amount associated with one or more input ingredients (e.g., an amount of crude).

In some embodiments, for at least one upstream pathway, the plant optimization system 140 may be configured to determine incurred processing data. In some embodiments, the incurred processing data may be data representative of an incurred processing amount associated with the intermediate physical stream 302. In this regard, for example, before reaching the intermediate physical stream 302, an intermediate product may have undergone processing by one or more of the plurality of physical units and/or plurality of physical streams in the plant 102. For example, an intermediate product associated with the intermediate physical stream 302 may have undergone processing in the intermediate physical unit 304 (e.g., a catalytic cracking physical unit). In this regard, for example, the incurred processing data may indicate at least a cost associated with the processing performed by the intermediate physical unit 304.

In some embodiments, the plant optimization system 140 may be configured to determine the input impact value data associated with the intermediate physical stream 302 based at least in part on the flow sheet model 300, the input contribution data, the input ingredient value data, and/or the incurred processing data. In this regard, for example, the plant optimization system 140 may be configured to determine the input impact value data at least in part by using equation (1):

$$\text{Input Impact Value Data} = \frac{1}{100}\sum_{upstream\ pathway\ j=1}^{m}\{\text{Input Contribution Data}_j \times (\text{Input Ingredient Value Data}_j + \text{Incurred Processing Data}_j)\}, \tag{1}$$

where there are (m) upstream pathways associated with the intermediate physical stream 302.

In some embodiments, the plant optimization system 140 may be configured to determine output impact value data for the intermediate physical stream 302. In some embodiments, the output impact value data for the intermediate physical stream 302 may be data representative of a value associated with one or more intermediate products outputted from the intermediate physical stream 302.

In some embodiments, the output impact value data may be determined based at least in part on the flow sheet model 300. In this regard, for example, the plant optimization system 140 may be configured to determine how many downstream pathways are associated with the intermediate physical stream 302. That is, the plant optimization system 140 may be configured to determine how many downstream pathways there are from the intermediate physical stream 302 to one or more final products. For example, the plant optimization system 140 may be configured to determine that the intermediate physical stream 302 has at least one downstream pathway, including a downstream pathway that includes at least one or more of an alkylation physical unit, a post alkylation physical stream, and/or a batch blending physical unit to reach a final product (e.g., gasoline). Said differently, the plant optimization system 140 may be configured to determine how many downstream pathways there are through which an intermediate product may transit through to become a final product.

In some embodiments, for at least one downstream pathway, the plant optimization system 140 may be configured to determine output contribution data. In some embodiments, output contribution data may be data representative of an amount of the overall mass and/or volume of the intermediate products associated with the intermediate physical stream 302 that becomes a particular final product through a particular downstream pathway. For example, if the intermediate physical stream 302 is associated with at least two downstream pathways, the plant optimization system 140 may be configured to determine output contribution data indicating that forty percent of the overall mass and/or volume of the intermediate products associated with the intermediate physical stream 302 are associated with a first downstream pathway and sixty of the overall mass and/or volume of the intermediate products associated with the intermediate physical stream 302 are associated with a second downstream pathway.

In some embodiments, for at least one downstream pathway, the plant optimization system 140 may be configured to determine final product value data associated with the intermediate physical stream 302. In some embodiments, the final product value data may be data representative of a value associated with one or more final products (e.g., final products associated with a downstream pathway associated with the intermediate physical stream 302). For example, the final product value data may be indicative of a price associated with the one or more final products (e.g., a price associated with gasoline). As another example, the final product value data may be indicative of an amount associated with one or more final products (e.g., an amount of gasoline).

In some embodiments, for at least one downstream pathway, the plant optimization system 140 may be configured to determine further processing data. In some embodiments, the further processing data may be data representative of a further processing amount associated with the intermediate physical stream 302. In this regard, for example, after leaving the intermediate physical stream 302, an intermediate product may undergo processing by one or more of the plurality of physical units and/or plurality of physical streams in the plant 102. For example, an intermediate product associated with the intermediate physical stream 302 may undergo processing in a second intermediate physical unit 314 (e.g., an alkylation physical unit). In this regard, for example, the further processing data may indicate at least a cost associated with the processing performed by the second intermediate physical unit 314.

In some embodiments, the plant optimization system 140 may be configured to determine the output impact value data associated with the intermediate physical stream 302 based at least in part on the flow sheet model 300, the output contribution data, the final product value data, and/or the further processing data. In this regard, for example, the plant optimization system 140 may be configured to determine the output impact value data at least in part by using equation (2):

$$\text{Output Impact Value Data} = \frac{1}{100}\sum_{downstream\ pathway\ i=1}^{n}\{\text{Output Contribution Data}_i \times (\text{Final Product Value Data}_i + \text{Further Processing Data}_i)\}, \tag{2}$$

where there are (n) downstream pathways associated with the intermediate physical stream 302.

In some embodiments, the plant optimization system 140 may be configured to determine differential impact value data associated with the intermediate physical stream 302. In some embodiments, the differential impact value data associated with the intermediate physical stream 302 may be determined based at least in part on the input impact value data and/or the output impact value data. In some embodiments, the differential impact value data may be data representative of a difference between the input impact value data and the output impact value data. In this regard, for example, the plant optimization system 140 may be configured to determine the differential impact value data at least in part by using equation (3):

$$\text{Differential Impact Value Data} = \text{Output Impact Value Data} - \text{Input Impact Value Data}, \tag{3}$$

In some embodiments, the plant optimization system 140 may be configured to generate an impact value report based at least in part on the input impact value data, the output impact value data, and/or the differential impact value data associated with the intermediate physical stream 302. In this regard, for example, the impact value report may include the input impact value data, the output impact value data, and/or the differential impact value data associated with the intermediate physical stream 302.

In some embodiments, the plant optimization system 140 may be configured to display the impact value report via an impact value report interface 400. In this regard, for example, the impact value report interface 400 may include an impact value report component 402 configured to display the impact value report associated with the intermediate physical stream 302. Additionally or alternatively, the impact value report interface 400 may include an input impact value component 404 configured to display the input impact value data associated with the intermediate physical stream 302. Additionally or alternatively, the impact value report interface 400 may include an output impact value component 406 configured to display the output impact value data associated with the intermediate physical stream 302. Additionally or alternatively, the impact value report interface 400 may include a differential impact value component 408 configured to display the differential impact value data associated with the intermediate physical stream 302.

In some embodiments, the plant optimization system 140 may be configured to update the impact value report interface 400 in real-time. For example, the plant optimization system 140 may be configured to update the impact value report interface 400 as the plant optimization system 140 determines input impact value data, output impact value data, and/or differential impact value data. Additionally or alternatively, the plant optimization system 140 may be configured to update the impact value report interface 400 on a periodic basis. For example, the plant optimization system 140 may be configured to update the impact value report interface 400 once per day. Additionally or alternatively, the plant optimization system 140 may be configured to update the impact value report interface 400 upon being triggered to update the impact value report interface 400. For example, the plant optimization system 140 may be configured to update the impact value report interface 400 upon receiving a selection of the update component 410.

In some embodiments, the plant optimization system 140 may be configured to initiate performance of one or more physical stream optimization actions based at least in part on the input impact value data, the output impact value data, and/or differential impact value data (e.g., cause one or more physical stream optimization actions to occur). For example, the plant optimization system 140 may be configured to initiate performance of a physical stream optimization action that includes increasing or decreasing a flow rate associated with the intermediate physical stream 302 (e.g., flow rate of an intermediate product associated with the intermediate physical stream 302). As another example, the plant optimization system 140 may be configured to initiate performance of a physical stream optimization action that includes increasing or decreasing a pressure associated with the intermediate physical stream 302. As another example, the plant optimization system 140 may be configured to initiate performance of a physical stream optimization action that includes increasing or decreasing a temperature associated with the intermediate physical stream 302 (e.g., temperature of an intermediate product associated with the intermediate physical stream 302). As another example, the plant optimization system 140 may be configured to initiate performance of a physical stream optimization action that includes increasing or decreasing a physical property or quality associated with the intermediate physical stream 302 (e.g., a physical property, such as concentration, impurity, viscosity, density, or color, of an intermediate product associated with the intermediate physical stream 302). As another example, the plant optimization system 140 may be configured to initiate performance of a physical stream optimization action that includes increasing, decreasing, or altering the hours of operation of the intermediate physical stream 302. As another example, the plant optimization system 140 may be configured to initiate performance of a physical stream optimization action that includes increasing or decreasing an emissions amount associated with the intermediate physical stream 302.

As another example, the plant optimization system 140 may be configured to initiate performance of a physical stream optimization action that includes one or more maintenance operations associated with the intermediate physical stream 302. In some embodiments, for example, the plant optimization system 140 may be configured to initiate performance of a physical stream optimization action that includes one or more maintenance operations associated with the intermediate physical stream 302 on a prioritized basis. For example, the plant optimization system 140 may be configured to prioritize the one or more maintenance operations associated with the intermediate physical stream 302 based at least in part on the input impact value, the output impact value, and/or the differential impact value data. Said differently, for example, if the intermediate physical stream 302 is associated with differential impact value data that indicates that the intermediate physical stream 302 is of greater value to the plant 102 than other physical streams of the plurality of physical streams, the plant optimization system 140 may be configured to prioritize initiating performance of a physical stream optimization action that includes one or more maintenance operations associated with the intermediate physical stream 302. Similarly, for example, if the intermediate physical stream 302 is associated with differential impact value data that indicates that the intermediate physical stream 302 is of less value to the plant 102 than other physical streams of the plurality of physical streams, the plant optimization system 140 may be configured to prioritize initiating performance of a physical stream optimization action that includes one or more maintenance operations associated with the intermediate physical stream 302.

In some embodiments, the plant optimization system 140 may be configured to identify an intermediate physical unit from the plurality of physical units of the plant 102. For example, the plant optimization system 140 may be configured to identify the intermediate physical unit 304. In some embodiments the intermediate physical unit 304 may be associated with unit processing data. In some embodiments, the unit processing data may be data representative of a processing amount associated with the intermediate physical unit 304. In this regard, for example, the intermediate physical unit 304 may be configured to perform processing on an intermediate product associated with the intermediate physical unit 304.

In some embodiments, the plant optimization system 140 may be configured to identify one or more input intermediate physical streams associated with the intermediate physical unit 304. For example, the plant optimization system 140 may be configured to identify an input intermediate physical stream 316 as one of the one or more intermediate physical streams. In some embodiments, at least one of the one or more input intermediate physical streams (e.g., input intermediate physical stream 316) may be configured to provide a first intermediate product to the intermediate physical unit 304.

In some embodiments, the one or more input intermediate physical streams may be associated with unit input contribution data. In some embodiments, the unit input contribution data may be data representative of an amount that each of the one or more input intermediate physical streams contributes to the total amount of intermediate products provided to the intermediate physical unit 304. For example, if the plant optimization system 140 identifies a first input intermediate physical stream associated with the intermediate physical unit 304 and a second input intermediate physical stream associated with the intermediate physical unit 304, the unit input contribution data may indicate that the first input intermediate physical stream contributes forty percent of the intermediate products provided to the intermediate physical unit 304 and the second input intermediate physical stream contributes sixty percent of the intermediate products provided to the intermediate physical unit 304.

In some embodiments, the plant optimization system 140 may be configured to determine input impact value data for each of the one or more input intermediate physical streams associated with the intermediate physical unit 304. For example, the plant optimization system 140 may be configured to determine input impact value data as described above (e.g., at least in part by using equation (1)).

In some embodiments, the plant optimization system 140 may be configured to determine unit input impact value data for the intermediate physical unit 304. In some embodiments, unit input impact value data may be data representative of a value associated with the intermediate physical unit 304. In some embodiments, the plant optimization system 140 may be configured to determine the unit input impact value data based at least in part on the input impact value data associated with each of the one or more input intermediate physical streams associated with the intermediate physical unit 304 and/or the unit input contribution data. In this regard, for example, the plant optimization system 140 may be configured to determine the unit input impact value data at least in part by using equation (4):

$$\text{Unit Input Impact Value Data} = \frac{1}{100}\sum_{\textit{input intermediate physical stream } j=1}^{m} \{\text{Unit Input Contribution Data}_j \times \text{Input Impact Value Data}_j, \tag{4}$$

where there are (m) input intermediate physical streams associated with the intermediate physical unit 304.

In some embodiments, the plant optimization system 140 may be configured to identify one or more output intermediate physical streams associated with the intermediate physical unit 304. For example, the plant optimization system 140 may be configured to identify output intermediate physical stream 318. In some embodiments, at least one of the one or more output intermediate physical streams (e.g., output intermediate physical stream 318) may be configured to receive a second intermediate product from intermediate physical unit 304. In this regard, for example, the intermediate physical unit 304 may be configured to generate the second intermediate product based at least in part on the first intermediate product (e.g., the first intermediate product being provided to the intermediate physical unit 304 by at least one of the one or more input intermediate physical streams associated with the intermediate physical unit 304).

In some embodiments, the one or more output intermediate physical streams may be associated with unit output contribution data. In some embodiments, the unit output contribution data may be data representative of an amount that each of the one or more output intermediate physical streams associated with contributes to the total amount of intermediate products received from the intermediate physical unit 304. For example, if the plant optimization system 140 identifies a first output intermediate physical stream associated with the intermediate physical unit 304 and a second output intermediate physical stream associated with the intermediate physical unit 304, the unit output contribution data may indicate that the first output intermediate physical stream contributes twenty percent of the intermediate products received from the intermediate physical unit 304 and the second output intermediate physical stream contributes eighty percent of the intermediate products received from the intermediate physical unit 304.

In some embodiments, the plant optimization system 140 may be configured to determine output impact value data for each of the one or more output intermediate physical streams associated with the intermediate physical unit 304. For example, the plant optimization system 140 may be configured to determine output impact value data as described above (e.g., at least in part by using equation (2)).

In some embodiments, the plant optimization system 140 may be configured to determine unit output impact value data for the intermediate physical unit 304. In some embodiments, unit output impact value data may be data representative of a value associated with the intermediate physical unit 304. In some embodiments, the plant optimization system 140 may be configured to determine the unit output impact value data based at least in part on the output impact value data associated with each of the one or more output intermediate physical streams associated with the intermediate physical unit 304 and/or the unit output contribution data. In this regard, for example, the plant optimization system 140 may be configured to determine the unit output impact value data at least in part by using equation (5):

$$\text{Unit Output Impact Value Data} = \frac{1}{100}\sum_{\textit{output intermediate physical stream } i=1}^{m} (\text{Unit Output Contribution Data}_i \times \text{Output Impact Value Data}_i, \tag{5}$$

where there are (n) output intermediate physical streams associated with the intermediate physical unit 304.

In some embodiments, the plant optimization system 140 may be configured to determine differential unit impact value data associated with the intermediate physical unit 304. In some embodiments, the differential unit impact value data associated with the intermediate physical unit 304 may be determined based at least in part on the unit input impact value data, the unit output impact value data, and/or the unit processing data. In some embodiments, the differential unit impact value data may be data at least partially representative of a difference between the unit input impact value data and the unit output impact value data. In this regard, for example, the plant optimization system 140 may be configured to determine the differential unit impact value data at least in part by using equation (6):

$$\text{Differential Unit Impact Value Data} = \text{Unit Output Impact Value Data} - \text{Unit Input Impact Value Data} - \text{Unit Processing Data}, \tag{6}$$

In some embodiments, the plant optimization system 140 may be configured to generate a unit impact value report based at least in part on the unit input impact value data, the unit output impact value data, and/or the unit differential impact value data associated with the intermediate physical unit 304. In this regard, for example, the unit impact value report may include the unit input impact value data, the unit output impact value data, and/or the unit differential impact value data associated with the intermediate physical unit 304.

In some embodiments, the plant optimization system 140 may be configured to display the unit impact value report via a unit impact value report interface 500. In this regard, for example, the unit impact value report interface 500 may include a unit impact value report component 502 configured to display the unit impact value report associated with the intermediate physical unit 304. Additionally or alternatively, the unit impact value report interface 500 may include a unit input impact value component 504 configured to display the unit input impact value data associated with the intermediate physical unit 304. Additionally or alternatively, the unit impact value report interface 500 may include a unit output impact value component 506 configured to display the unit output impact value data associated with the intermediate physical unit 304. Additionally or alternatively, the unit impact value report interface 500 may include a differential unit impact value component 508 configured to display the differential unit impact value data associated with the intermediate physical unit 304.

In some embodiments, the plant optimization system 140 may be configured to update the impact unit value report interface 500 in real-time. For example, the plant optimization system 140 may be configured to update the unit impact value report interface 500 as the plant optimization system 140 determines unit input impact value data, unit output impact value data, and/or differential unit impact value data. Additionally or alternatively, the plant optimization system 140 may be configured to update the unit impact value report interface 500 on a periodic basis. For example, the plant optimization system 140 may be configured to update the unit impact value report interface 500 once per day. Additionally or alternatively, the plant optimization system 140 may be configured to update the unit impact value report interface 500 upon being triggered to update the unit impact value report interface 500. For example, the plant optimization system 140 may be configured to update the unit impact value report interface 500 upon receiving a selection of the update component 510.

In some embodiments, the plant optimization system 140 may be configured to initiate performance of one or more physical unit optimization actions based at least in part on the unit input impact value data, the unit output impact value data, and/or the differential unit impact value data (e.g., cause one or more physical unit optimization actions to occur). For example, the plant optimization system 140 may be configured to initiate performance of a physical unit optimization action that includes increasing or decreasing a volume associated with the intermediate physical unit 304 (e.g., volume of an intermediate product associated with the intermediate physical unit 304). As another example, the plant optimization system 140 may be configured to initiate performance of a physical unit optimization action that includes increasing or decreasing a pressure associated with the intermediate physical unit 304. As another example, the plant optimization system 140 may be configured to initiate performance of a physical unit optimization action that includes increasing or decreasing a temperature associated with the intermediate physical unit 304 (e.g., temperature of an intermediate product associated with the intermediate physical unit 304). As another example, the plant optimization system 140 may be configured to initiate performance of a physical unit optimization action that includes increasing, decreasing, or altering the hours of operation of the intermediate physical unit 304. As another example, the plant optimization system 140 may be configured to initiate performance of a physical unit optimization action that includes increasing or decreasing an emissions amount associated with the intermediate physical unit 304.

As another example, the plant optimization system 140 may be configured to initiate performance of a physical unit optimization action that includes one or more maintenance operations associated with the intermediate physical unit 304. In some embodiments, for example, the plant optimization system 140 may be configured to initiate performance of a physical unit optimization action that includes one or more maintenance operations associated with the intermediate physical unit 304 on a prioritized basis. For example, the plant optimization system 140 may be configured to prioritize the one or more maintenance operations associated with the intermediate physical unit 304 based at least in part on the unit input impact value, the unit output impact value, and/or the unit differential impact value data. Said differently, for example, if the intermediate physical unit 304 is associated with unit differential impact value data that indicates that the intermediate physical unit 304 is of greater value to the plant 102 than other physical units of the plurality of physical units, the plant optimization system 140 may be configured to prioritize initiating performance of a physical unit optimization action that includes one or more maintenance operations associated with the intermediate physical unit 304. Similarly, for example, if the intermediate physical unit 304 is associated with unit differential impact value data that indicates that the intermediate physical unit 304 is of less value to the plant 102 than other physical units of the plurality of physical units, the plant optimization system 140 may be configured to prioritize initiating performance of a physical unit optimization action that includes one or more maintenance operations associated with the intermediate physical unit 304.

Example Methods

Figure 6:
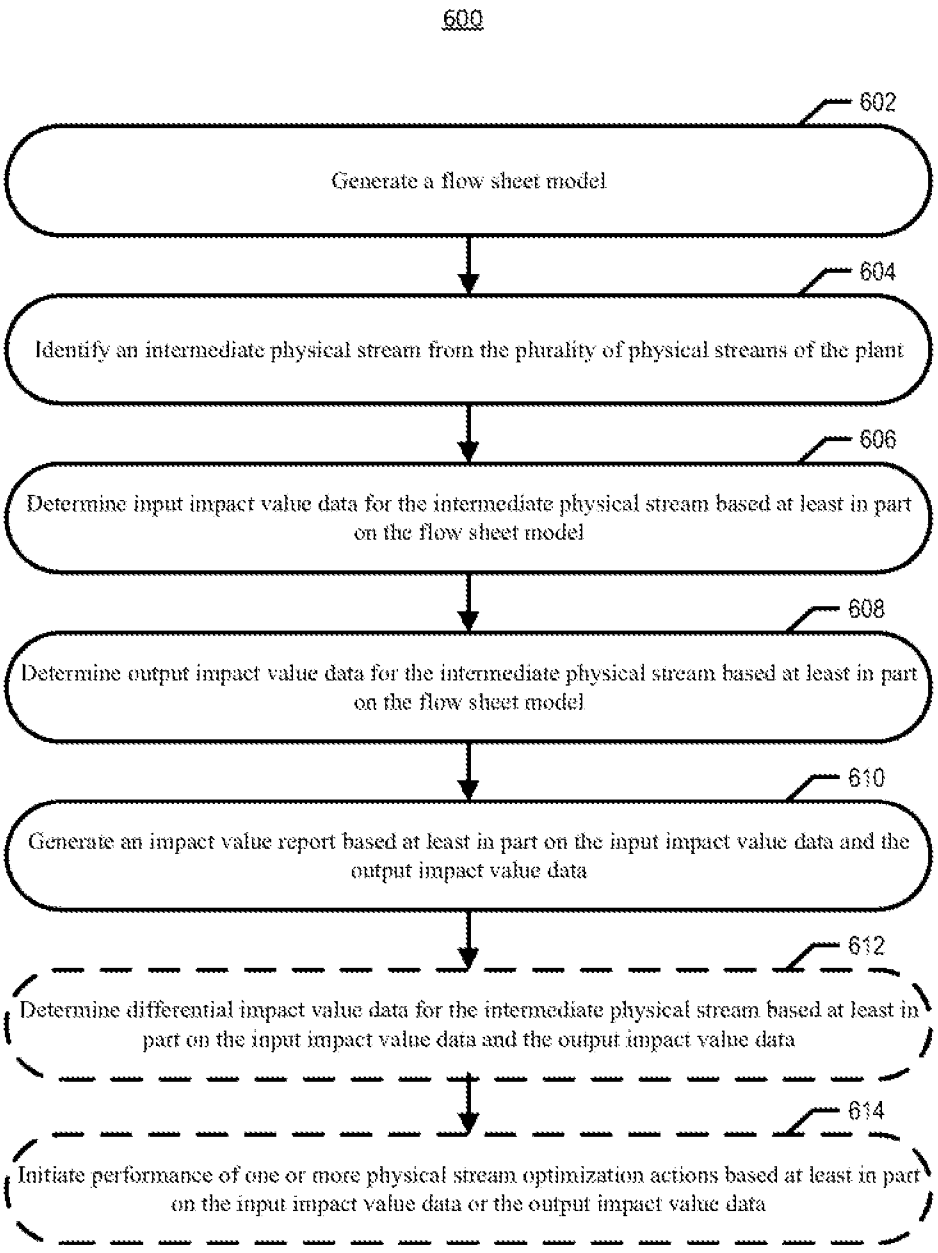
FIG. 6 illustrates a flowchart of an example method in accordance with one or more embodiments of the present disclosure.

Referring now to FIG. 6, a flowchart providing an example method 600 is illustrated. In this regard, FIG. 6 illustrates operations that may be performed by the plant optimization system 140, the user device 160, the plant 102, and/or the like. In some embodiments, the example method 600 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 600.

As shown in block 602, the method 600 may include generating a flow sheet model. As described above, in some embodiments, the plant optimization system may be configured to receive the flow sheet model. For example, the plant optimization system may be configured to receive the flow sheet model from the plant (e.g., the plant may be configured to generate the flow sheet model). In some embodiments, the flow sheet model may be representative of a layout of a plurality of physical units and/or a plurality of physical streams of the plant. In some embodiments, for example, the flow sheet model may be generated based at least in part on physical representation data associated with the plant.

In some embodiments, the plurality of physical streams may include one or more input physical streams. In this regard, an input physical stream may be configured to receive one or more input ingredients into the plant. For example, as illustrated in the flow sheet model, the plurality of physical streams may include an input physical stream (e.g., a crude physical stream). In some embodiments, the plurality of physical streams may include one or more output physical streams. In this regard, an output physical stream may be configured to output one or more final products from the plant. For example, as illustrated in the flow sheet model, the plurality of physical streams may include an output physical stream (e.g., a liquefied petroleum physical stream). In some embodiments, the plurality of physical streams may include one or more intermediate physical streams. In this regard, an intermediate physical stream may be configured to transport one or more intermediate products through the plant. For example, as illustrated in the flow sheet model, the plurality of physical streams may include an intermediate physical stream.

In some embodiments, the plurality of physical units may include one or more input physical units. In this regard, an input physical unit may be configured to transform one or more input ingredients into one or more intermediate products. For example, as illustrated in the flow sheet model, the plurality of physical units may include an input physical unit (e.g., a crude physical unit). In some embodiments, the plurality of physical units may include one or more output physical units. In this regard, an output physical unit may be configured to transform one or more intermediate products into one or more final products. For example, as illustrated in the flow sheet model, the plurality of physical units may include an output physical unit. In some embodiments, the plurality of physical units may include one or more intermediate physical units. In this regard, an intermediate physical unit may be configured to transform one or more intermediate products into one or more other intermediate products. For example, as illustrated in the flow sheet model, the plurality of physical units may include an intermediate physical unit (e.g., a catalytic cracking physical unit).

As shown in block 604, the method 600 may include identifying an intermediate physical stream from the plurality of physical streams of the plant. As described above, in some embodiments, the plant optimization system may be configured to identify an intermediate physical stream from the plurality of physical streams of the plant. For example, the plant optimization system may be configured to identify the intermediate physical stream.

As shown in block 606, the method 600 may include determining input impact value data for the intermediate physical stream based at least in part on the flow sheet model. As described above, in some embodiments, the plant optimization system may be configured to determine input impact value data for the intermediate physical stream. In some embodiments, the input impact value data for the intermediate physical stream may be data representative of a value associated with one or more intermediate products received into the intermediate physical stream.

In some embodiments, the input impact value data may be determined based at least in part on the flow sheet model. In this regard, for example, the plant optimization system may be configured to determine how many upstream pathways are associated with the intermediate physical stream. That is, the plant optimization system may be configured to determine how many upstream pathways there are from the intermediate physical stream to one or more input ingredients. For example, the plant optimization system may be configured to determine that the intermediate physical stream has at least four upstream pathways including, for example, an upstream pathway that includes at least one or more of a catalytic cracking physical unit, a heavy atmospheric gas oil physical stream, a crude physical unit to reach an input ingredient (e.g., crude). Said differently, the plant optimization system may be configured to determine how many upstream pathways there are from which an input ingredient and/or an intermediate product generated at least in part from the input ingredient could reach the intermediate physical stream.

In some embodiments, for at least one upstream pathway, the plant optimization system may be configured to determine input contribution data. In some embodiments, input contribution data may be data representative of an amount that a particular upstream pathway contributes to the overall mass and/or volume of the intermediate products associated with the intermediate physical stream. For example, if the intermediate physical stream is associated with four upstream pathways, the plant optimization system may be configured to determine input contribution data indicating that forty percent of the overall mass and/or volume of the intermediate products associated with the intermediate physical stream are associated with a first upstream pathway, thirty percent of the overall mass and/or volume of the intermediate products associated with the intermediate physical stream are associated with a second upstream pathway, twenty percent of the overall mass and/or volume of the intermediate products associated with the intermediate physical stream are associated with a third upstream pathway, and ten percent of the overall mass and/or volume of the intermediate products associated with the intermediate physical stream are associated with a fourth upstream pathway.

In some embodiments, for at least one upstream pathway, the plant optimization system may be configured to determine input ingredient value data associated with the intermediate physical stream. In some embodiments, the input ingredient value data may be data representative of a value associated with one or more input ingredients (e.g., input ingredients associated with an upstream pathway associated with the intermediate physical stream). For example, the input ingredient value data may be indicative of a cost associated with the one or more input ingredients (e.g., a cost associated with crude). As another example, the input ingredient value data may be indicative of an amount associated with one or more input ingredients (e.g., an amount of crude).

In some embodiments, for at least one upstream pathway, the plant optimization system may be configured to determine incurred processing data. In some embodiments, the incurred processing data may be data representative of an incurred processing amount associated with the intermediate physical stream. In this regard, for example, before reaching the intermediate physical stream, an intermediate product may have undergone processing by one or more of the plurality of physical units and/or plurality of physical streams in the plant. For example, an intermediate product associated with the intermediate physical stream may have undergone processing in the intermediate physical unit (e.g., a catalytic cracking physical unit). In this regard, for example, the incurred processing data may indicate at least a cost associated with the processing performed by the intermediate physical unit.

In some embodiments, the plant optimization system may be configured to determine the input impact value data associated with the intermediate physical stream based at least in part on the flow sheet model, the input contribution data, the input ingredient value data, and/or the incurred processing data. In this regard, for example, the plant optimization system may be configured to determine the input impact value data at least in part by using equation (7):

$$\text{Input Impact Value Data} = \frac{1}{100}\sum_{upstream\ pathway\ j=1}^{m}\{\text{Input Contribution Data}_j \times (\text{Input Ingredient Value Data}_j + \text{Incurred Processing Data}_j)\}, \tag{7}$$

where there are (m) upstream pathways associated with the intermediate physical stream.

As shown in block 608, the method 600 may include determining output impact value data for the intermediate physical stream based at least in part on the flow sheet model. As described above, in some embodiments, the plant optimization system may be configured to determine output impact value data for the intermediate physical stream. In some embodiments, the output impact value data for the intermediate physical stream may be data representative of a value associated with one or more intermediate products outputted from the intermediate physical stream.

In some embodiments, the output impact value data may be determined based at least in part on the flow sheet model. In this regard, for example, the plant optimization system may be configured to determine how many downstream pathways are associated with the intermediate physical stream. That is, the plant optimization system may be configured to determine how many downstream pathways there are from the intermediate physical stream to one or more final products. For example, the plant optimization system may be configured to determine that the intermediate physical stream has at least one downstream pathway, including a downstream pathway that includes at least one or more of an alkylation physical unit, a post alkylation physical stream, and/or a batch blending physical unit to reach a final product (e.g., gasoline). Said differently, the plant optimization system may be configured to determine how many downstream pathways there are through which an intermediate product may transit through to become a final product.

In some embodiments, for at least one downstream pathway, the plant optimization system may be configured to determine output contribution data. In some embodiments, output contribution data may be data representative of an amount of the overall mass and/or volume of the intermediate products associated with the intermediate physical stream that becomes a particular final product through a particular downstream pathway. For example, if the intermediate physical stream is associated with at least two downstream pathways, the plant optimization system may be configured to determine output contribution data indicating that forty percent of the overall mass and/or volume of the intermediate products associated with the intermediate physical stream are associated with a first downstream pathway and sixty of the overall mass and/or volume of the intermediate products associated with the intermediate physical stream are associated with a second downstream pathway.

In some embodiments, for at least one downstream pathway, the plant optimization system may be configured to determine final product value data associated with the intermediate physical stream. In some embodiments, the final product value data may be data representative of a value associated with one or more final products (e.g., final products associated with a downstream pathway associated with the intermediate physical stream). For example, the final product value data may be indicative of a price associated with the one or more final products (e.g., a price associated with gasoline). As another example, the final product value data may be indicative of an amount associated with one or more final products (e.g., an amount of gasoline).

In some embodiments, for at least one downstream pathway, the plant optimization system may be configured to determine further processing data. In some embodiments, the further processing data may be data representative of a further processing amount associated with the intermediate physical stream. In this regard, for example, after leaving the intermediate physical stream, an intermediate product may undergo processing by one or more of the plurality of physical units and/or plurality of physical streams in the plant. For example, an intermediate product associated with the intermediate physical stream may undergo processing in a second intermediate physical unit (e.g., an alkylation physical unit). In this regard, for example, the further processing data may indicate at least a cost associated with the processing performed by the second intermediate physical unit.

In some embodiments, the plant optimization system may be configured to determine the output impact value data associated with the intermediate physical stream based at least in part on the flow sheet model, the output contribution data, the final product value data, and/or the further processing data. In this regard, for example, the plant optimization system may be configured to determine the output impact value data at least in part by using equation (8):

$$\text{Output Impact Value Data} = \frac{1}{100}\sum_{downstream\ pathway\ i=1}^{n}\{\text{Output Contribution Data}_i \times (\text{Final Product Value Data}_i + \text{Further Processing Data}_i)\}, \tag{8}$$

where there are (n) downstream pathways associated with the intermediate physical stream.

As shown in block 610, the method 600 may include generating an impact value report based at least in part on the input impact value data and the output impact value data. As described above, in some embodiments, the plant optimization system may be configured to determine differential impact value data associated with the intermediate physical stream. In some embodiments, the differential impact value data associated with the intermediate physical stream may be determined based at least in part on the input impact value data and/or the output impact value data. In some embodiments, the differential impact value data may be data representative of a difference between the input impact value data and the output impact value data. In this regard, for example, the plant optimization system may be configured to determine the differential impact value data at least in part by using equation (9):

$$\text{Differential Impact Value Data} = \text{Output Impact Value Data} - \text{Input Impact Value Data}, \quad (9)$$

As shown in block 612, the method 600 may optionally include determining differential impact value data for the intermediate physical stream based at least in part on the input impact value data and the output impact value data. As described above, in some embodiments, the plant optimization system may be configured to generate an impact value report based at least in part on the input impact value data, the output impact value data, and/or the differential impact value data associated with the intermediate physical stream. In this regard, for example, the impact value report may include the input impact value data, the output impact value data, and/or the differential impact value data associated with the intermediate physical stream.

In some embodiments, the plant optimization system may be configured to display the impact value report via an impact value report interface. In this regard, for example, the impact value report interface may include an impact value report component configured to display the impact value report associated with the intermediate physical stream. Additionally or alternatively, the impact value report interface may include an input impact value component configured to display the input impact value data associated with the intermediate physical stream. Additionally or alternatively, the impact value report interface may include an output impact value component configured to display the output impact value data associated with the intermediate physical stream. Additionally or alternatively, the impact value report interface may include a differential impact value component configured to display the differential impact value data associated with the intermediate physical stream.

In some embodiments, the plant optimization system may be configured to update the impact value report interface in real-time. For example, the plant optimization system may be configured to update the impact value report interface as the plant optimization system determines input impact value data, output impact value data, and/or differential impact value data. Additionally or alternatively, the plant optimization system may be configured to update the impact value report interface on a periodic basis. For example, the plant optimization system may be configured to update the impact value report interface once per day. Additionally or alternatively, the plant optimization system may be configured to update the impact value report interface upon being triggered to update the impact value report interface. For example, the plant optimization system may be configured to update the impact value report interface upon receiving a selection of the update component.

As shown in block 614, the method 600 may optionally include initiating performance of one or more physical stream optimization actions based at least in part on the input impact value data or the output impact value data. As described above, in some embodiments, the plant optimization system may be configured to initiate performance of one or more physical stream optimization actions based at least in part on the input impact value data, the output impact value data, and/or differential impact value data (e.g., cause one or more physical stream optimization actions to occur). For example, the plant optimization system may be configured to initiate performance of a physical stream optimization action that includes increasing or decreasing a flow rate associated with the intermediate physical stream (e.g., flow rate of an intermediate product associated with the intermediate physical stream). As another example, the plant optimization system may be configured to initiate performance of a physical stream optimization action that includes increasing or decreasing a pressure associated with the intermediate physical stream. As another example, the plant optimization system may be configured to initiate performance of a physical stream optimization action that includes increasing or decreasing a temperature associated with the intermediate physical stream (e.g., temperature of an intermediate product associated with the intermediate physical stream). As another example, the plant optimization system may be configured to initiate performance of a physical stream optimization action that includes increasing or decreasing a physical property or quality associated with the intermediate physical stream (e.g., a physical property, such as concentration, impurity, viscosity, density, or color, of an intermediate product associated with the intermediate physical stream). As another example, the plant optimization system may be configured to initiate performance of a physical stream optimization action that includes increasing, decreasing, or altering the hours of operation of the intermediate physical stream. As another example, the plant optimization system may be configured to initiate performance of a physical stream optimization action that includes increasing or decreasing an emissions amount associated with the intermediate physical stream.

As another example, the plant optimization system may be configured to initiate performance of a physical stream optimization action that includes one or more maintenance operations associated with the intermediate physical stream. In some embodiments, for example, the plant optimization system may be configured to initiate performance of a physical stream optimization action that includes one or more maintenance operations associated with the intermediate physical stream on a prioritized basis. For example, the plant optimization system may be configured to prioritize the one or more maintenance operations associated with the intermediate physical stream based at least in part on the input impact value, the output impact value, and/or the differential impact value data. Said differently, for example, if the intermediate physical stream is associated with differential impact value data that indicates that the intermediate physical stream is of greater value to the plant than other physical streams of the plurality of physical streams, the plant optimization system may be configured to prioritize initiating performance of a physical stream optimization action that includes one or more maintenance operations associated with the intermediate physical stream. Similarly, for example, if the intermediate physical stream is associated with differential impact value data that indicates that the intermediate physical stream is of less value to the plant than other physical streams of the plurality of physical streams, the plant optimization system may be configured to prioritize initiating performance of a physical stream optimization action that includes one or more maintenance operations associated with the intermediate physical stream.

Figure 7:
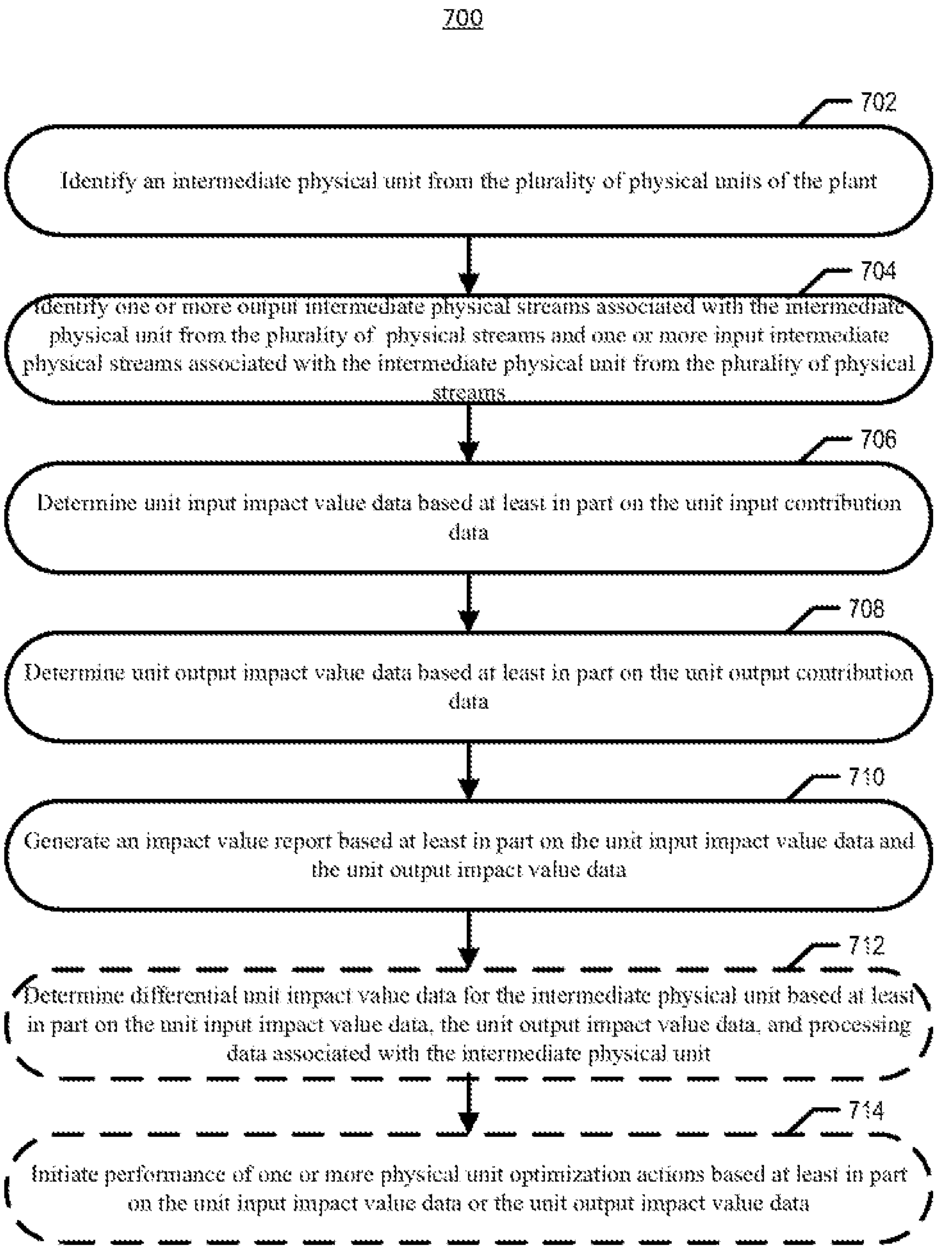
FIG. 7 illustrates a flowchart of an example method in accordance with one or more embodiments of the present disclosure.

Referring now to FIG. 7, a flowchart providing an example method 700 is illustrated. In this regard, FIG. 7 illustrates operations that may be performed by the plant optimization system 140, the user device 160, the plant 102, and/or the like. In some embodiments, the example method

700 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 700.

As shown in block 702, the method 700 may include identifying an intermediate physical unit from the plurality of physical units of the plant. As described above, in some embodiments, the intermediate physical unit may be associated with unit processing data. In some embodiments, the unit processing data may be data representative of a processing amount associated with the intermediate physical unit. In this regard, for example, the intermediate physical unit may be configured to perform processing on an intermediate product associated with the intermediate physical unit.

As shown in block 704, the method 700 may include identifying one or more output intermediate physical streams associated with the intermediate physical unit from the plurality of physical streams and one or more input intermediate physical streams associated with the intermediate physical unit from the plurality of physical streams. As described above, in some embodiments, the plant optimization system may be configured to identify one or more input intermediate physical streams associated with the intermediate physical unit. For example, the plant optimization system may be configured to identify an input intermediate physical stream as one of the one or more intermediate physical streams. In some embodiments, at least one of the one or more input intermediate physical streams (e.g., input intermediate physical stream) may be configured to provide a first intermediate product to the intermediate physical unit.

In some embodiments, the one or more input intermediate physical streams may be associated with unit input contribution data. In some embodiments, the unit input contribution data may be data representative of an amount that each of the one or more input intermediate physical streams contributes to the total amount of intermediate products provided to the intermediate physical unit. For example, if the plant optimization system identifies a first input intermediate physical stream associated with the intermediate physical unit and a second input intermediate physical stream associated with the intermediate physical unit, the unit input contribution data may indicate that the first input intermediate physical stream contributes forty percent of the intermediate products provided to the intermediate physical unit and the second input intermediate physical stream contributes sixty percent of the intermediate products provided to the intermediate physical unit.

In some embodiments, the plant optimization system may be configured to identify one or more output intermediate physical streams associated with the intermediate physical unit. For example, the plant optimization system may be configured to identify output intermediate physical stream. In some embodiments, at least one of the one or more output intermediate physical streams (e.g., output intermediate physical stream) may be configured to receive a second intermediate product from intermediate physical unit. In this regard, for example, the intermediate physical unit may be configured to generate the second intermediate product based at least in part on the first intermediate product (e.g., the first intermediate product being provided to the intermediate physical unit by at least one of the one or more input intermediate physical streams associated with the intermediate physical unit).

In some embodiments, the one or more output intermediate physical streams may be associated with unit output contribution data. In some embodiments, the unit output contribution data may be data representative of an amount that each of the one or more output intermediate physical streams associated with contributes to the total amount of intermediate products received from the intermediate physical unit. For example, if the plant optimization system identifies a first output intermediate physical stream associated with the intermediate physical unit and a second output intermediate physical stream associated with the intermediate physical unit, the unit output contribution data may indicate that the first output intermediate physical stream contributes twenty percent of the intermediate products received from the intermediate physical unit and the second output intermediate physical stream contributes eighty percent of the intermediate products received from the intermediate physical unit.

As shown in block 706, the method 700 may include determining unit input impact value data based at least in part on the unit input contribution data. As described above, in some embodiments, the plant optimization system may be configured to determine input impact value data for each of the one or more input intermediate physical streams associated with the intermediate physical unit. For example, the plant optimization system may be configured to determine input impact value data as described above (e.g., at least in part by using equation (7)).

In some embodiments, the plant optimization system may be configured to determine unit input impact value data for the intermediate physical unit. In some embodiments, unit input impact value data may be data representative of a value associated with the intermediate physical unit. In some embodiments, the plant optimization system may be configured to determine the unit input impact value data based at least in part on the input impact value data associated with each of the one or more input intermediate physical streams associated with the intermediate physical unit and/or the unit input contribution data. In this regard, for example, the plant optimization system may be configured to determine the unit input impact value data at least in part by using equation (10):

$$\text{Unit Input Impact Value Data} = \frac{1}{100}\sum_{\textit{input intermediate physical stream } j=1}^{m} \{\text{Unit Input Contribution Data}_j \times \text{Input Impact Value Data}_j, \tag{10}$$

where there are (m) input intermediate physical streams associated with the intermediate physical unit.

As shown in block 708, the method 700 may include determining unit output impact value data based at least in part on the unit output contribution data. As described above, in some embodiments, the plant optimization system may be configured to determine output impact value data for each of the one or more output intermediate physical streams associated with the intermediate physical unit. For example, the plant optimization system may be configured to determine output impact value data as described above (e.g., at least in part by using equation (8)).

In some embodiments, the plant optimization system may be configured to determine unit output impact value data for the intermediate physical unit. In some embodiments, unit output impact value data may be data representative of a value associated with the intermediate physical unit. In some embodiments, the plant optimization system may be configured to determine the unit output impact value data based at least in part on the output impact value data associated with each of the one or more output intermediate physical streams associated with the intermediate physical unit and/or the unit output contribution data. In this regard, for example, the plant optimization system may be configured to determine the unit output impact value data at least in part by using equation (11):

$$\text{Unit Output Impact Value Data} = \frac{1}{100}\sum_{output\ intermediate\ physical\ stream\ i=1}^{n} (\text{Unit Output Contribution Data}_i \times \text{Output Impact Value Data}_i, \tag{11}$$

where there are (n) output intermediate physical streams associated with the intermediate physical unit.

As shown in block 710, the method 700 may include generating an impact value report based at least in part on the unit input impact value data and the unit output impact value data.

As described above, in some embodiments, the plant optimization system may be configured to determine differential unit impact value data associated with the intermediate physical unit. In some embodiments, the differential unit impact value data associated with the intermediate physical unit may be determined based at least in part on the unit input impact value data, the unit output impact value data, and/or the unit processing data. In some embodiments, the differential unit impact value data may be data at least partially representative of a difference between the unit input impact value data and the unit output impact value data. In this regard, for example, the plant optimization system may be configured to determine the differential unit impact value data at least in part by using equation (12):

$$\text{Differential Unit Impact Value Data} = \text{Unit Output Impact Value Data} - \text{Unit Input Impact Value Data} - \text{Unit Processing Data}, \tag{12}$$

As shown in block 712, the method 700 may optionally include determining differential unit impact value data for the intermediate physical unit based at least in part on the unit input impact value data, the unit output impact value data, and unit processing data associated with the intermediate physical unit. As described above, in some embodiments, the plant optimization system may be configured to generate a unit impact value report based at least in part on the unit input impact value data, the unit output impact value data, and/or the unit differential impact value data associated with the intermediate physical unit. In this regard, for example, the unit impact value report may include the unit input impact value data, the unit output impact value data, and/or the unit differential impact value data associated with the intermediate physical unit.

In some embodiments, the plant optimization system may be configured to display the unit impact value report via a unit impact value report interface. In this regard, for example, the unit impact value report interface may include a unit impact value report component configured to display the unit impact value report associated with the intermediate physical unit. Additionally or alternatively, the unit impact value report interface may include a unit input impact value component configured to display the unit input impact value data associated with the intermediate physical unit. Additionally or alternatively, the unit impact value report interface may include a unit output impact value component configured to display the unit output impact value data associated with the intermediate physical unit. Additionally or alternatively, the unit impact value report interface may include a differential unit impact value component configured to display the differential unit impact value data associated with the intermediate physical unit.

In some embodiments, the plant optimization system may be configured to update the impact unit value report interface in real-time. For example, the plant optimization system may be configured to update the unit impact value report interface as the plant optimization system determines unit input impact value data, unit output impact value data, and/or differential unit impact value data. Additionally or alternatively, the plant optimization system may be configured to update the unit impact value report interface on a periodic basis. For example, the plant optimization system may be configured to update the unit impact value report interface once per day. Additionally or alternatively, the plant optimization system may be configured to update the unit impact value report interface upon being triggered to update the unit impact value report interface. For example, the plant optimization system may be configured to update the unit impact value report interface upon receiving a selection of the update component.

As shown in block 714, the method 700 may optionally include initiating performance of one or more physical unit optimization actions based at least in part on the unit input impact value data or the unit output impact value data. As described above, in some embodiments, the plant optimization system may be configured to initiate performance of one or more physical unit optimization actions based at least in part on the unit input impact value data, the unit output impact value data, and/or the differential unit impact value data (e.g., cause one or more physical unit optimization actions to occur). For example, the plant optimization system may be configured to initiate performance of a physical unit optimization action that includes increasing or decreasing a volume associated with the intermediate physical unit (e.g., volume of an intermediate product associated with the intermediate physical unit). As another example, the plant optimization system may be configured to initiate performance of a physical unit optimization action that includes increasing or decreasing a pressure associated with the intermediate physical unit. As another example, the plant optimization system may be configured to initiate performance of a physical unit optimization action that includes increasing or decreasing a temperature associated with the intermediate physical unit (e.g., temperature of an intermediate product associated with the intermediate physical unit). As another example, the plant optimization system may be configured to initiate performance of a physical unit optimization action that includes increasing, decreasing, or altering the hours of operation of the intermediate physical unit. As another example, the plant optimization system may be configured to initiate performance of a physical unit optimization action that includes increasing or decreasing an emissions amount associated with the intermediate physical unit.

As another example, the plant optimization system may be configured to initiate performance of a physical unit optimization action that includes one or more maintenance operations associated with the intermediate physical unit. In some embodiments, for example, the plant optimization system may be configured to initiate performance of a physical unit optimization action that includes one or more maintenance operations associated with the intermediate physical unit on a prioritized basis. For example, the plant optimization system may be configured to prioritize the one or more maintenance operations associated with the intermediate physical unit based at least in part on the unit input impact value, the unit output impact value, and/or the unit differential impact value data. Said differently, for example, if the intermediate physical unit is associated with unit differential impact value data that indicates that the intermediate physical unit is of greater value to the plant than other physical units of the plurality of physical units, the plant optimization system may be configured to prioritize initiating performance of a physical unit optimization action that includes one or more maintenance operations associated with the intermediate physical unit. Similarly, for example, if the intermediate physical unit is associated with unit differential impact value data that indicates that the intermediate physical unit is of less value to the plant than other physical units of the plurality of physical units, the plant optimization system may be configured to prioritize initiating performance of a physical unit optimization action that includes one or more maintenance operations associated with the intermediate physical unit.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

That which is claimed:

1. A computer-implemented method comprising:

generating a flow sheet model, wherein the flow sheet model is representative of a layout of a plurality of physical units and a plurality of physical streams of a plant;

identifying an intermediate physical unit from the plurality of physical units of the plant;

identifying one or more output intermediate physical streams associated with the intermediate physical unit from the plurality of physical streams and one or more input intermediate physical streams associated with the intermediate physical unit from the plurality of physical streams, wherein the one or more output intermediate physical streams are associated with unit output contribution data and the one or more unit input intermediate physical streams are associated with unit input contribution data;

determining unit input impact value data based at least in part on the unit input contribution data;

determining unit output impact value data based at least in part on the unit output contribution data;

generating an impact value report based at least in part on the unit input impact value data and the unit output impact value data; and storing the impact value report in anon-transitory memory, and using the stored impact value report to initiate one or more optimization actions to adjust at least one operating parameter of the plant based on the impact value report, wherein the plant is operated based on the at least one adjusted operating parameter.

2. The computer-implemented method of claim 1, further comprising:

identifying an intermediate physical stream from the plurality of physical streams of the plant;

determining input impact value data for the intermediate physical stream based at least in part on the flow sheet model;

determining output impact value data for the intermediate physical stream based at least in part on the flow sheet model; and generating an impact value report based at least in part on the input impact value data and the output impact value data.

3. The computer-implemented method of claim 2, further comprising:

initiating performance of one or more physical stream optimization actions based at least in part on the input impact value data or the output impact value data.

4. The computer-implemented method of claim 2, wherein the flow sheet model is generated based at least in part on a physical representation data associated with the plant.

5. The computer-implemented method of claim 2, further comprising:

determining differential impact value data for the intermediate physical stream based at least in part on the input impact value data and the output impact value data.

6. The computer-implemented method of claim 1, wherein at least one of the one or more input intermediate physical streams is configured to provide a first intermediate product to the intermediate physical unit.

7. The computer-implemented method of claim 6, wherein at least one of the one or more output intermediate physical streams is configured to receive a second intermediate product from the intermediate physical unit.

8. The computer-implemented method of claim 7, wherein the intermediate physical unit is configured to generate the second intermediate product based at least in part on the first intermediate product.

9. The computer-implemented method of claim 1, further comprising:

determining differential unit impact value data for the intermediate physical unit based at least in part on the unit input impact value data, the unit output impact value data, and unit processing data associated with the intermediate physical unit.

10. The computer-implemented method of claim 1, further comprising:

initiating performance of one or more physical unit optimization actions based at least in part on the unit input impact value data or the unit output impact value data.

11. An apparatus comprising at least one processor and at least one non-transitory memory including computer-coded instructions thereon, the computer coded instructions, with the at least one processor, cause the apparatus to:

generate a flow sheet model, wherein the flow sheet model is representative of a layout of a plurality of physical units and a plurality of physical streams of a plant;

identify an intermediate physical unit from the plurality of physical units of the plant;

identify one or more output intermediate physical streams associated with the intermediate physical unit from the plurality of physical streams and one or more input intermediate physical streams associated with the intermediate physical unit from the plurality of physical streams, wherein the one or more output intermediate physical streams are associated with unit output contribution data and the one or more unit input intermediate physical streams are associated with unit input contribution data;

determine unit input impact value data based at least in part on the unit input contribution data;

determine unit output impact value data based at least in part on the unit output contribution data;

generate an impact value report based at least in part on the unit input impact value data and the unit output impact value data; and store the impact value report in anon-transitory memory, and using the stored impact value report to initiate one or more optimization actions to adjust at least one operating parameter of the plant based on the impact value report, wherein the plant is operated based on the at least one adjusted operating parameter.

12. The apparatus of claim 11, wherein the computer coded instructions, further with the at least one processor, cause the apparatus to:

identify an intermediate physical stream from the plurality of physical streams of the plant;

determine input impact value data for the intermediate physical stream based at least in part on the flow sheet model;

determine output impact value data for the intermediate physical stream based at least in part on the flow sheet model; and generate an impact value report based at least in part on the input impact value data and the output impact value data.

13. The apparatus of claim 12, wherein the computer coded instructions, further with the at least one processor, cause the apparatus to:

initiate performance of one or more physical stream optimization actions based at least in part on the input impact value data or the output impact value data.

14. The apparatus of claim 12, wherein the computer coded instructions, further with the at least one processor, cause the apparatus to:

determine differential impact value data for the intermediate physical stream based at least in part on the input impact value data and the output impact value data.

15. The apparatus of claim 11, wherein at least one of the one or more input intermediate physical streams is configured to provide a first intermediate product to the intermediate physical unit.

16. The apparatus of claim 15, wherein at least one of the one or more output intermediate physical streams is configured to receive a second intermediate product from the intermediate physical unit.

17. The apparatus of claim 16, wherein the intermediate physical unit is configured to generate the second intermediate product based at least in part on the first intermediate product.

18. The apparatus of claim 11, wherein the computer coded instructions, further with the at least one processor, cause the apparatus to:

determine differential unit impact value data for the intermediate physical unit based at least in part on the unit input impact value data, the unit output impact value data, and unit processing data associated with the intermediate physical unit.

19. The apparatus of claim 11, wherein the computer coded instructions, further with the at least one processor, cause the apparatus to:

initiate performance of one or more physical unit optimization actions based at least in part on the unit input impact value data or the unit output impact value data.

20. A computer program product comprising at least one non-transitory computer-readable storage medium having computer program code stored thereon that, in execution with at least one processor, configures the computer program product for:

generating a flow sheet model, wherein the flow sheet model is representative of a layout of a plurality of physical units and a plurality of physical streams of a plant;

identifying an intermediate physical unit from the plurality of physical units of the plant;

identifying one or more output intermediate physical streams associated with the intermediate physical unit from the plurality of physical streams and one or more input intermediate physical streams associated with the intermediate physical unit from the plurality of physical streams, wherein the one or more output intermediate physical streams are associated with unit output contribution data and the one or more unit input intermediate physical streams are associated with unit input contribution data;

determining unit input impact value data based at least in part on the unit input contribution data;

determining unit output impact value data based at least in part on the unit output contribution data;

generating an impact value report based at least in part on the unit input impact value data and the unit output impact value data; and storing the impact value report in anon-transitory memory, and using the stored impact value report to initiate one or more optimization actions to adjust at least one operating parameter of the plant based on the impact value report, wherein the plant is operated based on the at least one adjusted operating parameter.

* * * * *